US012322917B2

(12) United States Patent
Txarola et al.

(10) Patent No.: US 12,322,917 B2
(45) Date of Patent: Jun. 3, 2025

(54) IDCC CONNECTION SYSTEM AND PROCESS

(71) Applicant: J.S.T. CORPORATION, Farmington Hills, MI (US)

(72) Inventors: Joseph Txarola, Farmington Hills, MI (US); Gwendolyn Upson, Ypsilanti, MI (US); Ping Chen, Novi, MI (US)

(73) Assignee: J.S.T. CORPORATION, Farmington Hills, MI (US)

(*) Notice: Subject to any disclaimer, the term of this patent is extended or adjusted under 35 U.S.C. 154(b) by 0 days.

(21) Appl. No.: 17/158,891

(22) Filed: Jan. 26, 2021

(65) Prior Publication Data

US 2021/0151907 A1 May 20, 2021

Related U.S. Application Data

(62) Division of application No. 16/174,825, filed on Oct. 30, 2018, now Pat. No. 11,658,426.

(Continued)

(51) Int. Cl.
*H01R 13/41* (2006.01)
*H01R 4/2429* (2018.01)

(Continued)

(52) U.S. Cl.
CPC ......... *H01R 4/2429* (2013.01); *H01R 9/2416* (2013.01); *H01R 12/515* (2013.01); *H01R 12/585* (2013.01); *H01R 13/40* (2013.01); *H01R 13/41* (2013.01); *H01R 43/01* (2013.01); *H01R 43/205* (2013.01); *H01R 12/712* (2013.01)

(58) Field of Classification Search
CPC .... H01R 12/585; H01R 13/05; H01R 4/2429; H01R 12/515; H01R 12/58; H01R 12/7064; H01R 4/00; H01R 4/24; H01R 4/2404; H01R 4/2445; H01R 4/2495; H01R 9/031; H01R 9/053; H01R 12/616; H01R 12/67; H01R 12/675
See application file for complete search history.

(56) References Cited

U.S. PATENT DOCUMENTS 4,256,360 A * 3/1981 Debaigt ............... H01R 4/2429 439/399
4,909,754 A * 3/1990 Paradis ................ H01R 4/2429 439/405

(Continued)

FOREIGN PATENT DOCUMENTS

CN 201113029 Y * 9/2008 ......... H01R 12/7029

*Primary Examiner* — Felix O Figueroa
(74) *Attorney, Agent, or Firm* — Kratz, Quintos & Hanson, LLP

(57) ABSTRACT

An Insulation Displacement Contact Compliant connector system (IDCC) which includes a housing, header pins, and a Printed Circuit Board (PCB). Each header pin has at least a single barb to be retained into the housing. Each pin has a blade for contacting a wire. A compliant feature on the pin retains itself into holes in the PCB. The housing has a negative space similarly shaped to the pin. The housing includes a strain relief which provides a lead-in for a wire. When the system is fully assembled, the pins reside in the housing, and exit through the housing and into and through respective holes in the PCB. A wire can be inserted into the housing once the pins reside in the housing.

10 Claims, 29 Drawing Sheets

Related U.S. Application Data

(60) Provisional application No. 62/579,325, filed on Oct. 31, 2017.

(51) Int. Cl.

| | |
|---|---|
| ***H01R 9/24*** | (2006.01) |
| ***H01R 12/51*** | (2011.01) |
| ***H01R 12/58*** | (2011.01) |
| ***H01R 13/40*** | (2006.01) |
| ***H01R 43/01*** | (2006.01) |
| ***H01R 43/20*** | (2006.01) |
| *H01R 12/71* | (2011.01) |

(56) References Cited

U.S. PATENT DOCUMENTS

| | | | | |
|---|---|---|---|---|
| 5,788,539 | A * | 8/1998 | Fedder | H01R 12/716 439/74 |
| 5,997,337 | A * | 12/1999 | Torii | H01R 4/2466 439/942 |
| 6,007,366 | A * | 12/1999 | Torii | H01R 43/0256 439/397 |
| 6,050,842 | A * | 4/2000 | Ferrill | H01R 13/6461 439/404 |
| 6,050,845 | A * | 4/2000 | Smalley, Jr. | H01R 12/515 439/417 |
| 6,093,048 | A * | 7/2000 | Arnett | H01R 12/58 439/82 |
| 6,168,478 | B1 * | 1/2001 | Daoud | H01R 4/2429 439/854 |
| 7,070,442 | B2 * | 7/2006 | Yamanashi | H01R 4/2433 439/417 |
| 7,736,173 | B2 * | 6/2010 | Chen | H01R 13/41 439/404 |
| 7,976,334 | B2 * | 7/2011 | Bishop | H01R 4/2433 439/404 |
| 8,708,733 | B2 * | 4/2014 | Parrish | H01R 4/242 439/395 |
| 9,083,091 | B1 * | 7/2015 | Ravlich | H01R 4/2425 |
| 2019/0131723 | A1 * | 5/2019 | Txarola | H01R 9/2416 |
| 2021/0151907 | A1 * | 5/2021 | Txarola | H01R 13/40 |
| 2021/0175642 | A1 * | 6/2021 | Txarola | H01R 4/2429 |

* cited by examiner

IDCC CONNECTION SYSTEM AND PROCESS

CROSS-REFERENCE TO RELATED APPLICATIONS

This application is a Divisional of U.S. patent application Ser. No. 16/174,825, filed Oct. 30. 2018, which claims priority of U.S. provisional application No. 62/579,235, filed Oct. 31, 2017.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention generally relates to the field of electrical connectors, which are useful in automotive applications, or the like.

2. Description of the Related Art

An insulation-displacement contact (IDC) is an electrical contact designed to be connected to the conductor(s) of an insulated cable by a connection process that forces a selectively sharpened blade or blades through the insulation, bypassing the need to strip the conductors of insulation before connecting. A compliant pin is a pin that adheres to a PCB through the application of normal force and interference fit. Insulation Displacement Contact Compliant header pins (IDCC header pins) are used in connector systems. In use, during an insertion process, the header pin is placed into a housing and secured, allowing the housing to then be attached to a circuit board using a compliant end, with no solder, and have wires (conductors) inserted into the blades thereof. In many examples of the related art, when IDCC pins are inserted into a housing, the securing of the header pins requires an additional component, such as a plastic cover or pronged terminal system.

BRIEF SUMMARY OF THE INVENTION

An Insulation Displacement Contact Compliant connector system (IDCC) and process for using an IDCC connection system. The IDCC connection system includes IDCC header pins and a housing. The system and the process may include a printed circuit board (PCB). Each IDCC header pin is comprised of an upper section, a pin barb section, and a lower section. Each IDCC header pin has at least a first pin barb on its pin barb section, to allow it to be retained into the housing. The pin barbs anchor the header pin into the housing. The upper section of each IDCC header pin also has a blade to contact a wire and displace the insulation thereof. The lower section of the pins has an associated compliant retention feature which allows the IDCC header pin to be retained into respective holes in the PCB.

The housing has a negative space similarly shaped to side walls of the IDCC header pin. The housing may include a strain relief which provides a lead-in for a wire. When the system is fully assembled, the pins reside in the housing, and exit through the housing and into and through respective holes in the PCB. A wire can be inserted into the housing and pass the strain relief lead-in, and the wire is then secure. The wire then contacts the blade of the pins in the housing. Further embodiments of the housing can also have a twisting strain relief, as well as retention posts that allow the housing to be secured to the PCB. There are several options for the assembly process including a) a pin-to-housing insertion process; b) a housing assembly-to-PCB process or a connector-to-PCB process; and c) a wired housing assembly-to-PCB assembly process or a wire harness-to-PCB assembly process.

BRIEF DESCRIPTION OF THE SEVERAL VIEWS OF DRAWINGS

FIGS. 8A-E are cross-sectional views of steps of an inventive process of assembling the IDCC header pin to a housing.

Figure 11A:
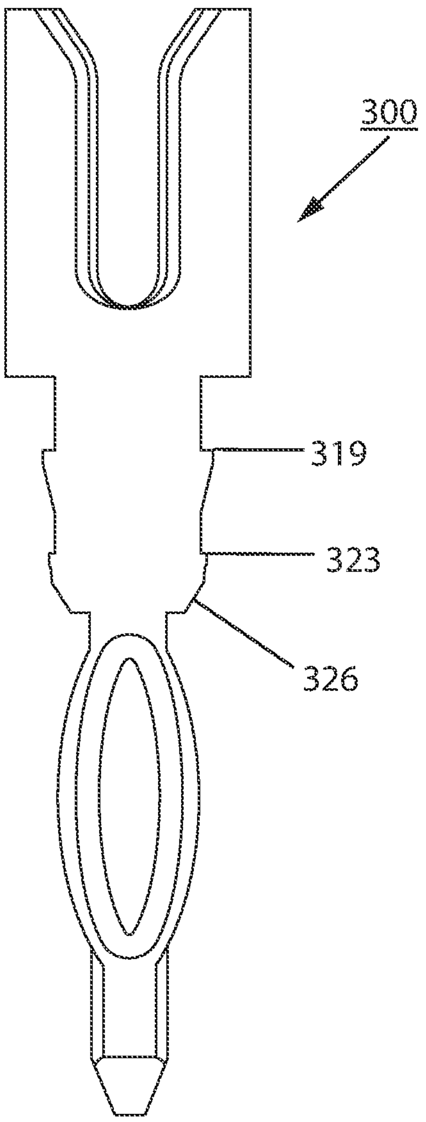
Figure 11B:
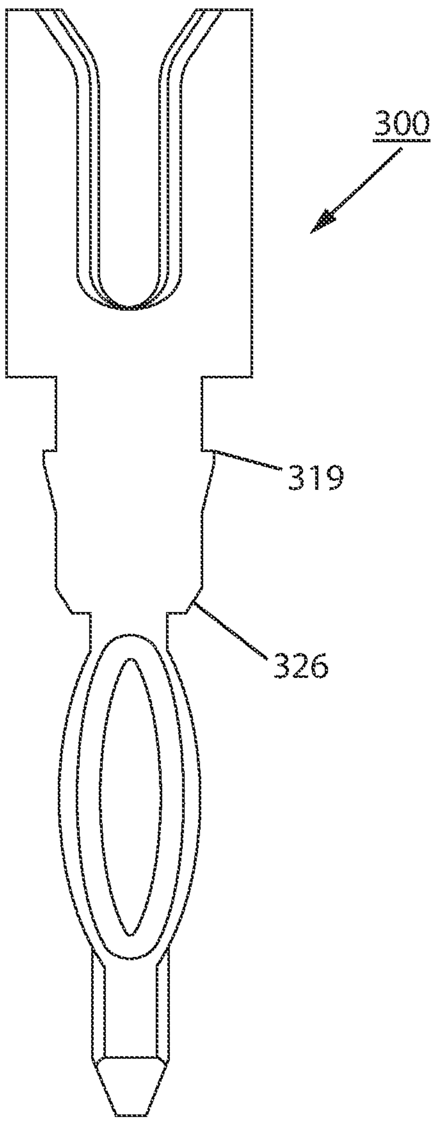
Figure 11C:
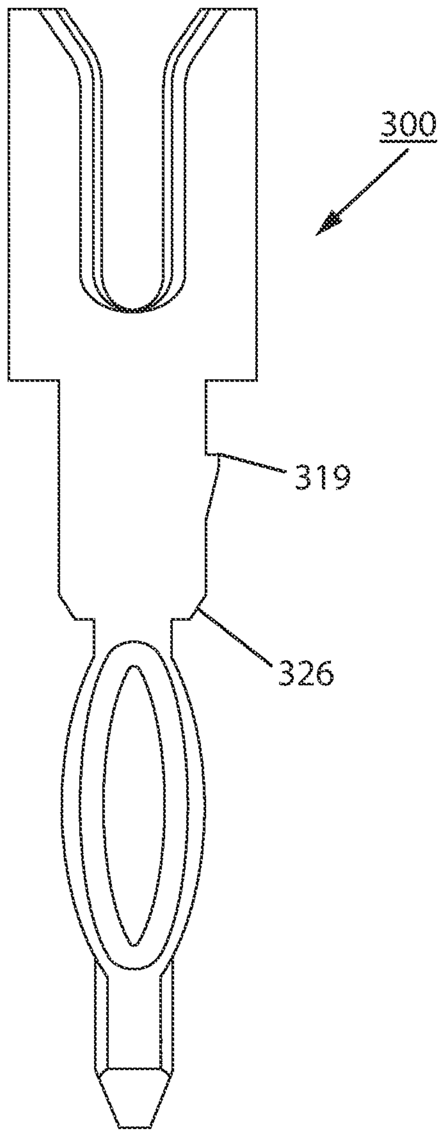

FIGS. 9A-D are cross-sectional views of steps of an inventive process of assembling the housing to a printed circuit board;

FIGS. 10A-D are cross-sectional views illustrating steps of assembling a wire to the system of the invention;

FIGS. 11A, B, C, D, E F and G are front elevation views of another embodiments of an IDCC header pin.

Figure 12:
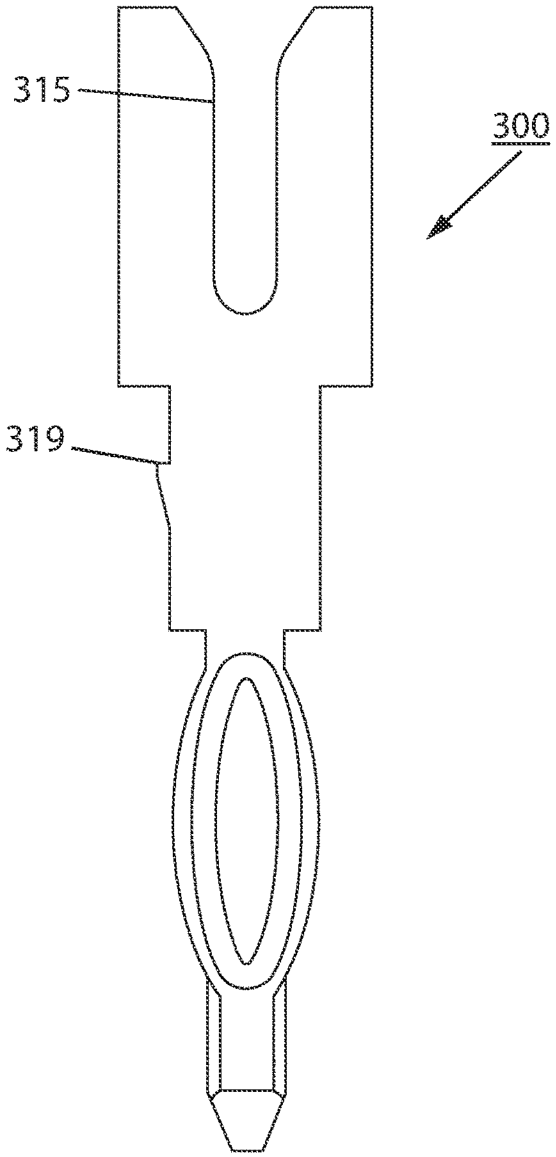

FIG. 12 is a front elevation view of another embodiment of an IDCC header pin.

DETAILED DESCRIPTION OF THE INVENTION

The present invention provides an IDCC connection system and process for using an IDCC connection system.

Figure 1:
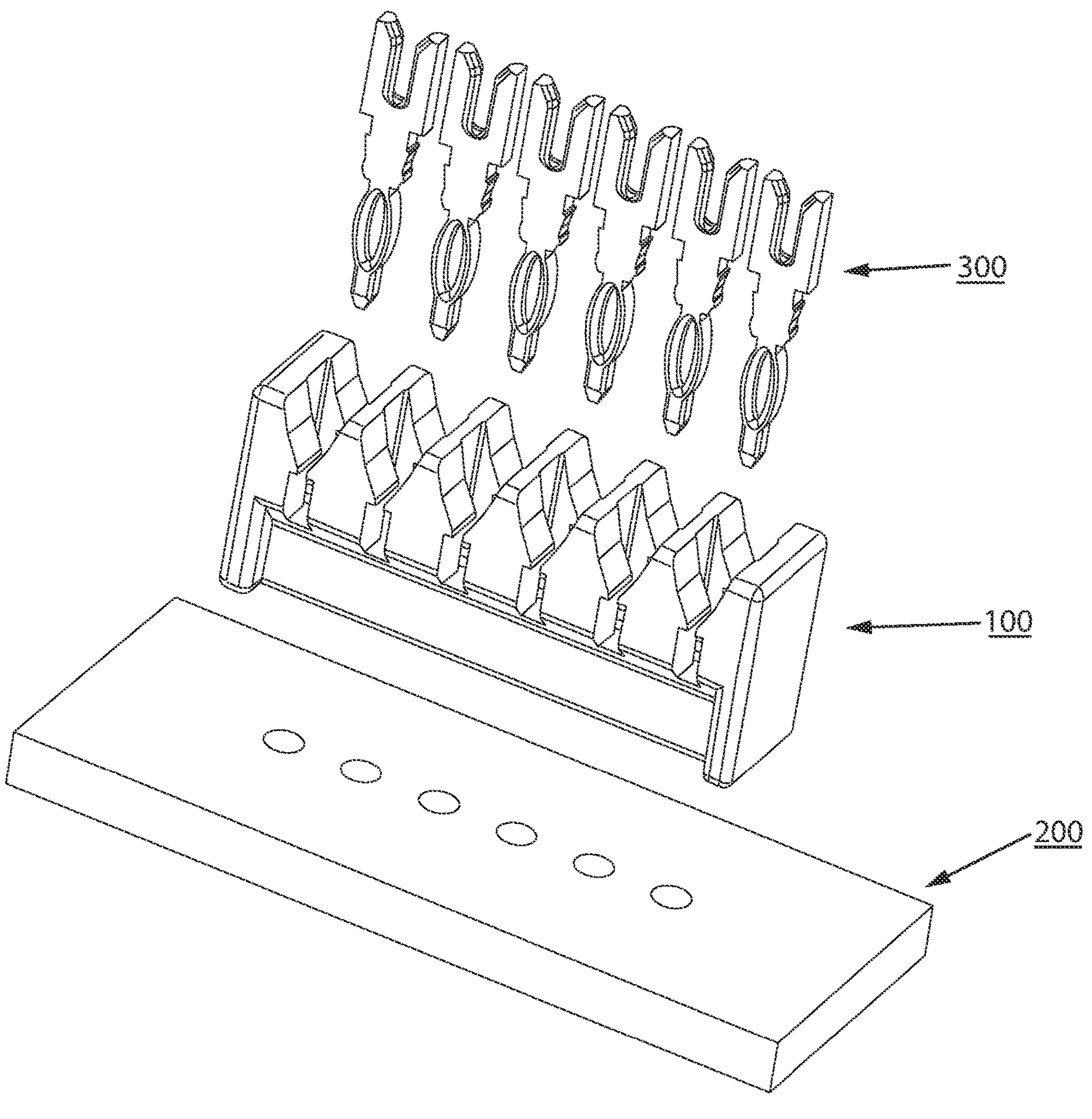
FIG. 1 is an exploded perspective view of one embodiment of the IDCC connection system of the present invention before assembly, including an IDCC header pin, a housing and a printed circuit board.
Figure 2:
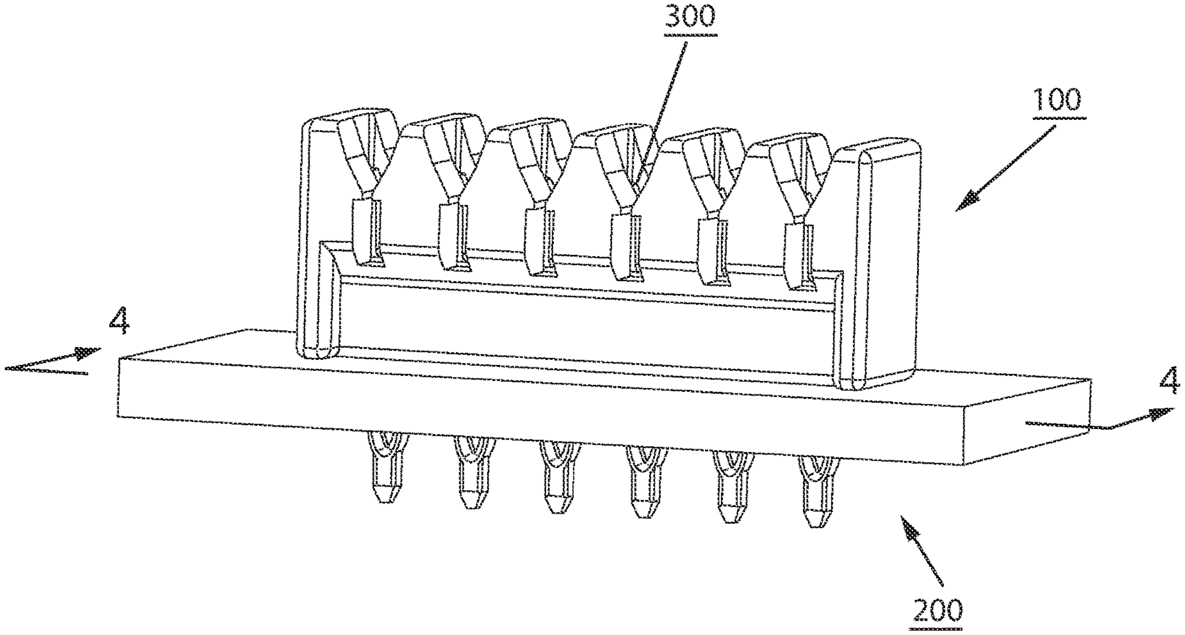
FIG. 2 is a perspective view of one embodiment of the IDCC connection system of the present invention after assembly, including an IDCC header pin, a housing, and a printed circuit board.

As shown in FIG. 1, the IDCC connection system includes IDCC header pins 300, a housing 100 and a printed circuit board (PCB) 200. When fully assembled, as shown in FIG. 2. IDCC header pins 300 reside in housing 100 and are inserted through printed circuit board 200.

Figure 3:
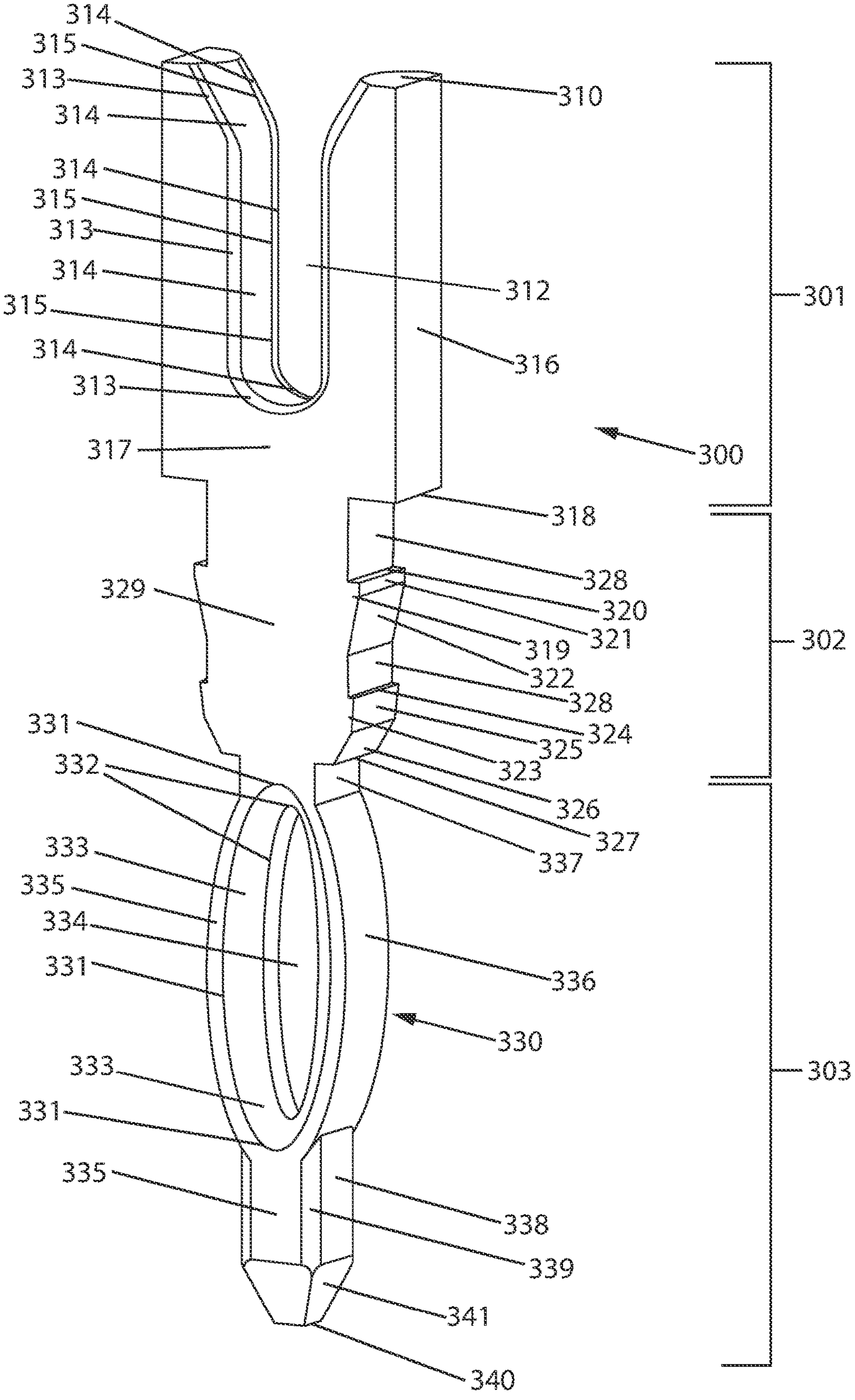
FIG. 3 is a perspective view of one embodiment of the IDCC header pin of the present invention.

FIG. 3 illustrates the IDCC header pin 300 in more detail. As shown in FIG. 3, the IDCC header pin 300 can be considered to have a lengthwise direction and can be considered to have three sections: an upper section 301, a pin barb section 302 and a lower section 303.

In upper section 301, at one end, in the lengthwise direction of the IDCC header pin 300 is IDC flat 310, which includes two flat regions perpendicular to the lengthwise direction of IDCC header pin 300. The IDCC flat 310 is a surface on which a machine/jig can apply force to the IDCC header pin 300 to insert it into housing 100. Along the side of the lengthwise direction of the upper section 301 are side walls 316. At the opposite end of the IDCC header pin 300 in the lengthwise direction, is IDCC header pin tip 340. The lower section 303 includes pin lead-in chamfers 341, which are angled to prevent stubbing of the header pin 300 when it is inserted into and through the housing or a hole in a printed circuit board.

In upper section 301, below the IDCC flat 310 in FIG. 3 is IDCC blade 315. IDC blades are known in the art and are capable of cutting into the wire jacket of a wire conductor to make non-damaging electrical contact with a wire conductor. IDCC blade 315 is generally of a horseshoe shape with a gap 312 between the blade 315. The upper section 301 additionally has a first surface 313 and a second surface 314 which form a beveled surface from the face 317 of the upper section 301 to the IDCC blade 315. Further, in the IDCC header pin embodiment in FIG. 12 the first surface 313 and second surface 314 are optionally omitted from the upper section 301 structure.

Figure 4:
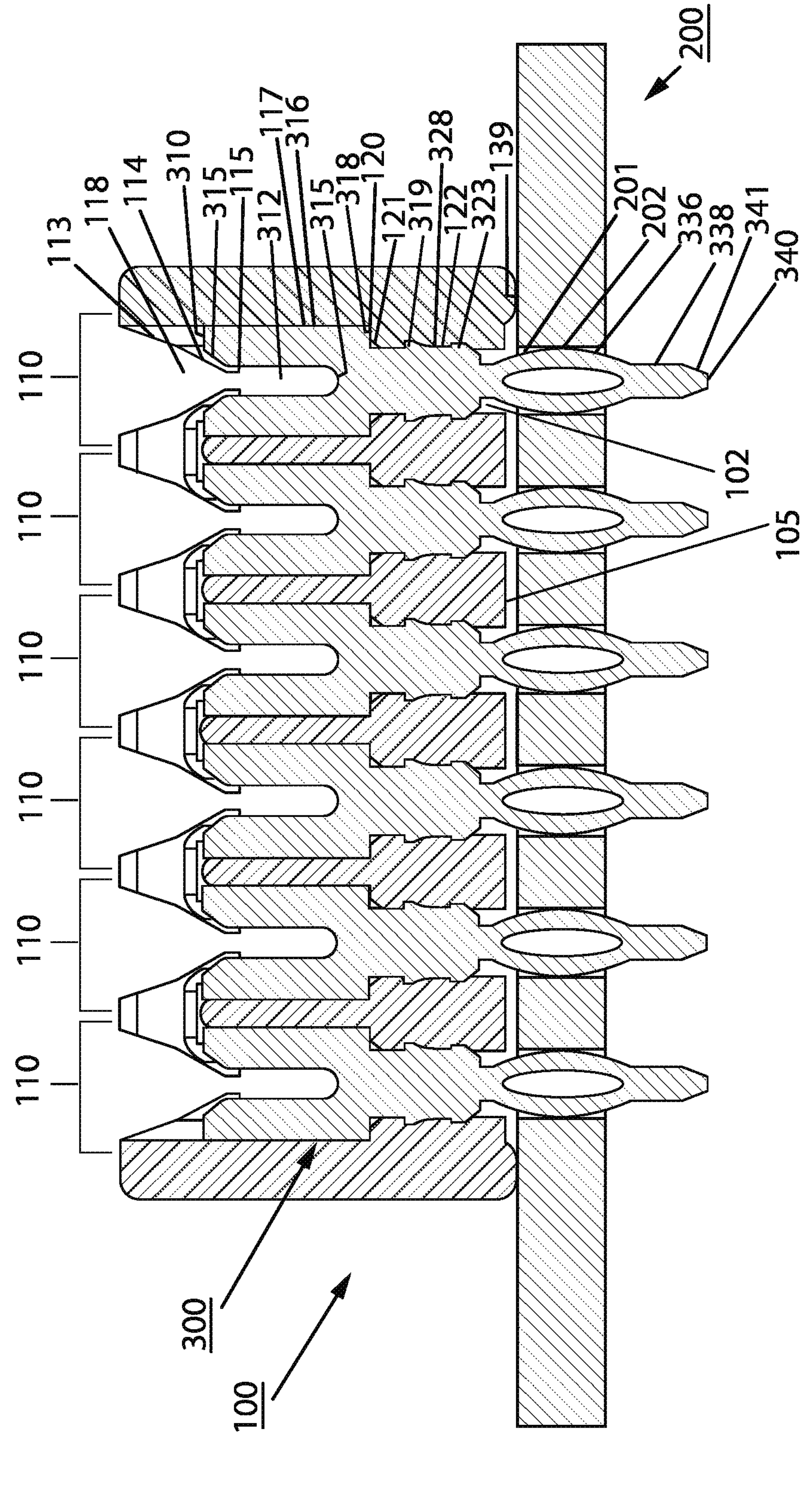
FIG. 4 is a front elevation cross-sectional view of an embodiment of the assembled IDCC connection system, showing the relationship between the IDCC header pin, the housing, and the printed circuit board.

Below the IDCC blade 315 in FIG. 3 (i.e., in the direction toward tip 340), in the lower portion of upper section 301, is forward stop 318, which includes two opposite flat regions perpendicular to the lengthwise direction of the IDCC header pin 300 and facing generally toward tip 340. This forward stop 318 functions to end forward motion of the IDCC header pin 300 when inserted into the housing 100, and defines the position of the IDCC header pin 300 when fully inserted in the housing 100 (see FIG. 4).

Below the forward stop 318 is pin barb section 302. Pin barb section 302 includes a face surface 329 and sides 328. The sides 328 have at least a first pin barb 319. Pin barbs are known in the art and function to anchor and retain the IDCC header pin 300 when inserted into a housing, preventing it from being withdrawn (see FIG. 4). First pin barb 319, is an angled protrusion which extends outward from side 328 and has a top surface 320 perpendicular to the lengthwise direction of the pin 300. The first pin barb 319 further includes a side wall 321 which is generally parallel to the lengthwise direction of the pin 300 and an outward angled side wall 322 leading up to the lower end of side wall 321. In FIG. 3, first pin barb 319 is present on opposite sides 328 of pin barb section 302 respectively. In FIG. 3, below the first pin barb 319 is second pin barb 323, also an angled protrusion which extends outward from side 328 and has a top surface 324 perpendicular to the lengthwise direction of the pin 300. The second pin barb 323 further includes a side wall 325 which is generally parallel to the lengthwise direction of the pin 300 and extends from an upper end of an angled barb lead-in chamfer 326 at the bottom of pin barb section 302. In FIG. 3, second pin barb 323 is present on opposite sides 328 of pin barb section 302 respectively. Second pin barb 323 also serves to anchor and retain the IDCC header pin 300 when inserted into the housing 100 (see FIG. 4). It is possible for the IDCC header pin to have only a single first pin barb (see FIG. 12) and any additional pin barbs (see FIG. 11A-E), but generally a pair of first and second pin barbs on opposite sides of the pin barb section 302 will be present (see FIGS. 3, 11A) to provide a sufficient anchoring into the housing 100.

At the lower end of pin barb section 302, is the barb lead-in chamfer 326, which is an angled wall, angled upward from a bottom surface 327 of pin barb section 302 which is perpendicular to the lengthwise direction of the IDCC header pin 300. The barb lead-in chamfer 326 serves to lead the pin barb section 302 of the IDCC header pin 300 into the housing 100 and thereby prevent stubbing of the IDCC header pin 300 during insertion into the housing. Further, in the embodiment in FIGS. 11D and 12 the barb lead-in chamfer is optionally omitted from the pin structure (see FIG. 11D, 12).

As further illustrated in FIG. 3, below the barb lead-in chamfer 326, in lower section 303, is compliant retention feature 330, in an eye-of-the-needle design. The compliant retention feature 330 includes oval rounded sides 336 and an inner beveled wall 333 which forms an oval shaped inner hole 334. The oval rounded sides 336 extend outward from sides 337, 338, and 339 of lower section 303. In the center of the compliant retention feature 330 is an oval shaped inner hole 334. The inner hole 334 is formed by an inner beveled wall 333 which angles inward from the face 335 of the lower section 303. The surface of the beveled side wall extends from an outer edge 331 to an inner edge 332. The inner edge 332 forms a perimeter around the inner hole 334 in the middle of the compliant retention feature 330. The compliant retention feature flexes inward when pressure is applied to the oval rounded sides 336. Compliant retention feature 330 of the IDCC header pin penetrates a respective hole 201 in the PCB 200 when the IDCC connection system is assembled. The oval rounded sides 336 are compressed and flex inward by the inside edge 202 of the hole 201 when inserted into the PCB 200, thereby the oval rounded sides 336 provide pressure outward against the inside edges 202 of the hole 200.

Figure 11D:
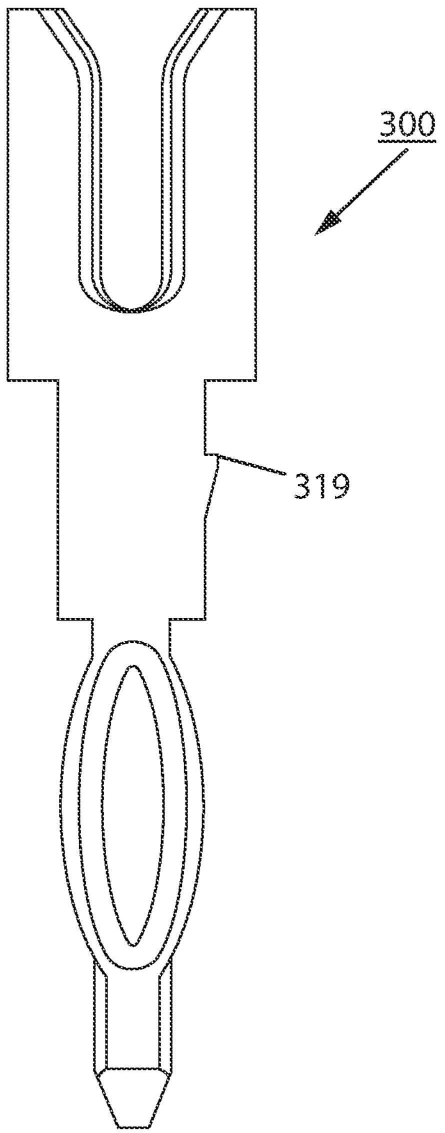
Figure 11E:
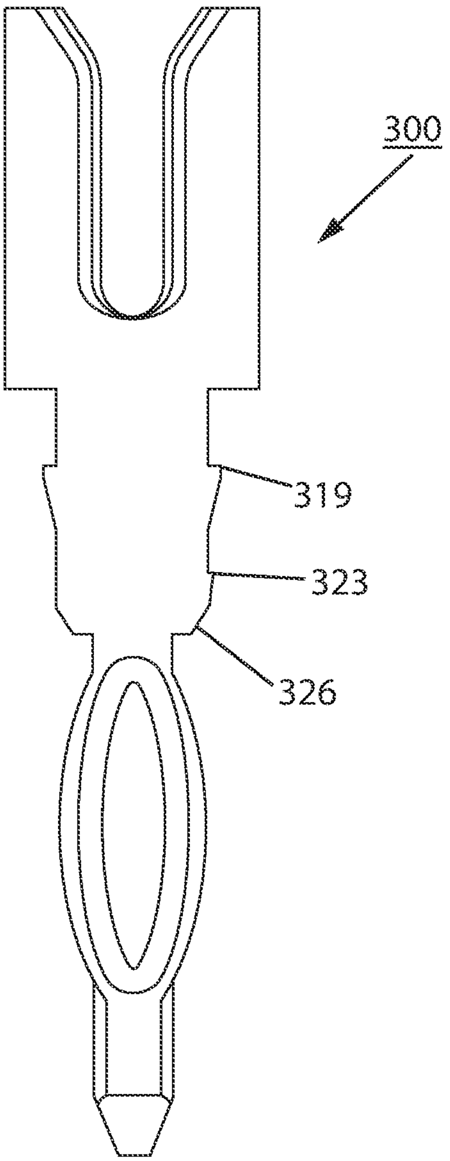
Figure 11F:
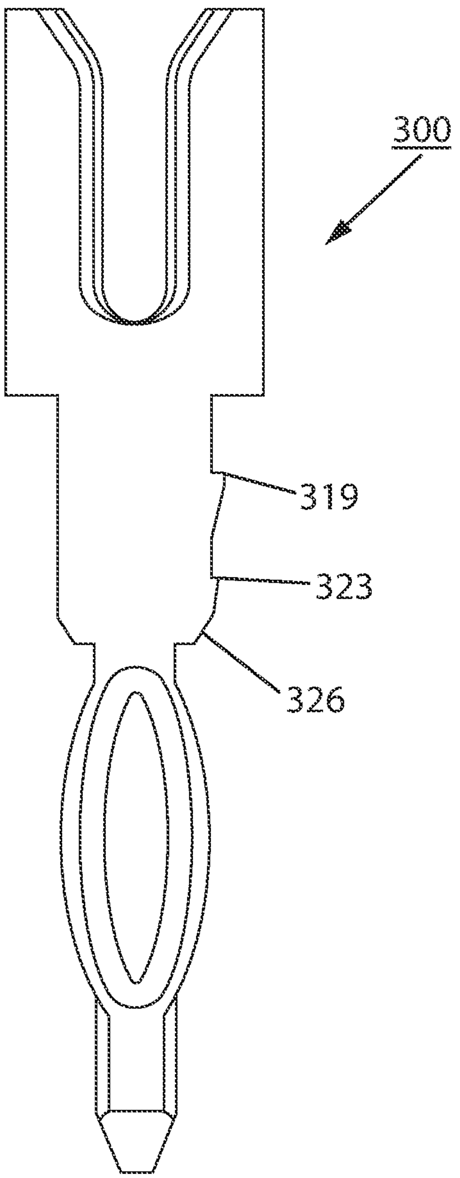
Figure 11G:
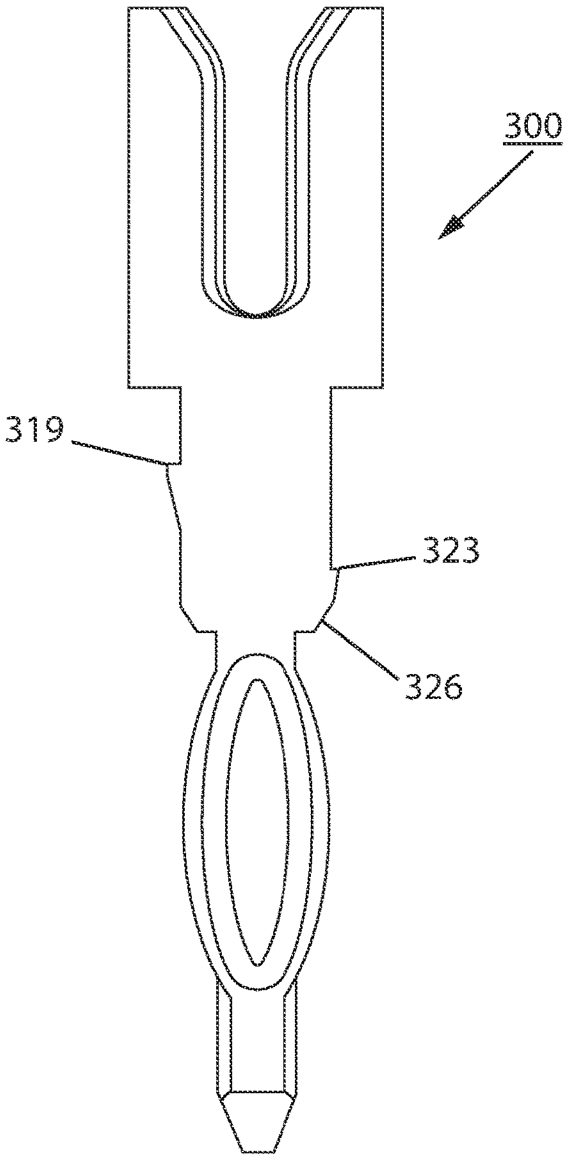

Shown in FIGS. 11A-G are embodiments of IDCC header pin 300, wherein the pin 300 has at least one of a first pin barb and an arrangement of additional first and second pin barbs as shown. In FIGS. 11D, 12 the pin barb section chamfer is removed. These embodiments are not limited to the combinations shown but allow for a combination of these features.

Figure 5A:
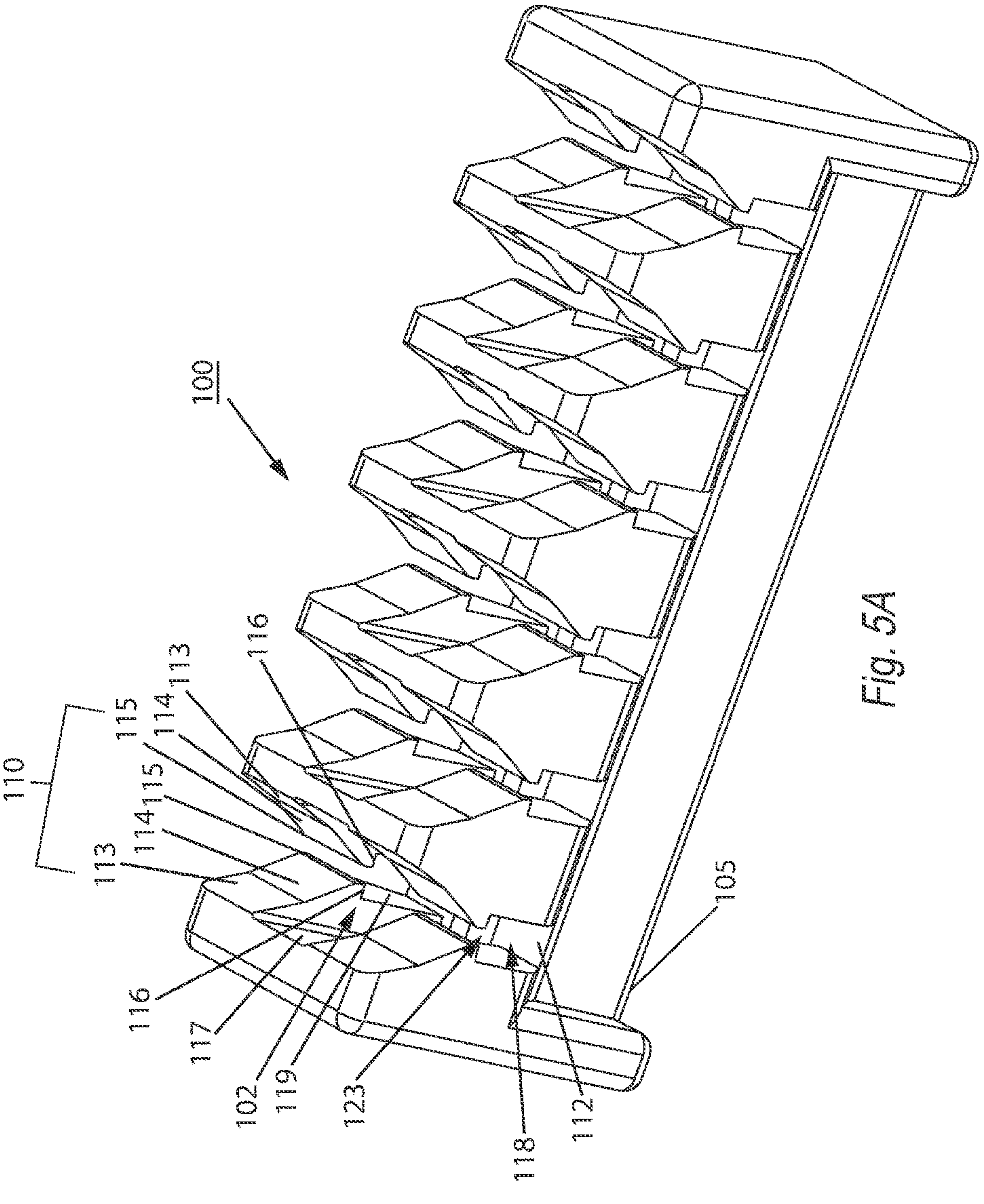
FIG. 5A is a perspective view of one embodiment of the housing of the invention.

The structure of the housing 100 is shown in greater detail in FIGS. 5A, B and C. In the embodiment shown in FIG. 5A, the housing 100 is generally rectangular in structure, having a bottom surface 105, which, when assembled with a printed circuit board (PCB) 200 will face the top flat surface of the PCB 200 (see FIG. 4). In one embodiment, the housing 100 has offsets 139 on the bottom surface 105 of the housing. Offsets 139 serve to contact the PCB 200 evenly and offset the bottom surface 105 from contact with the PCB 200. The offsets 139 cease forward motion and properly level the connector 100 against the top of PCB 200.

Figure 6:
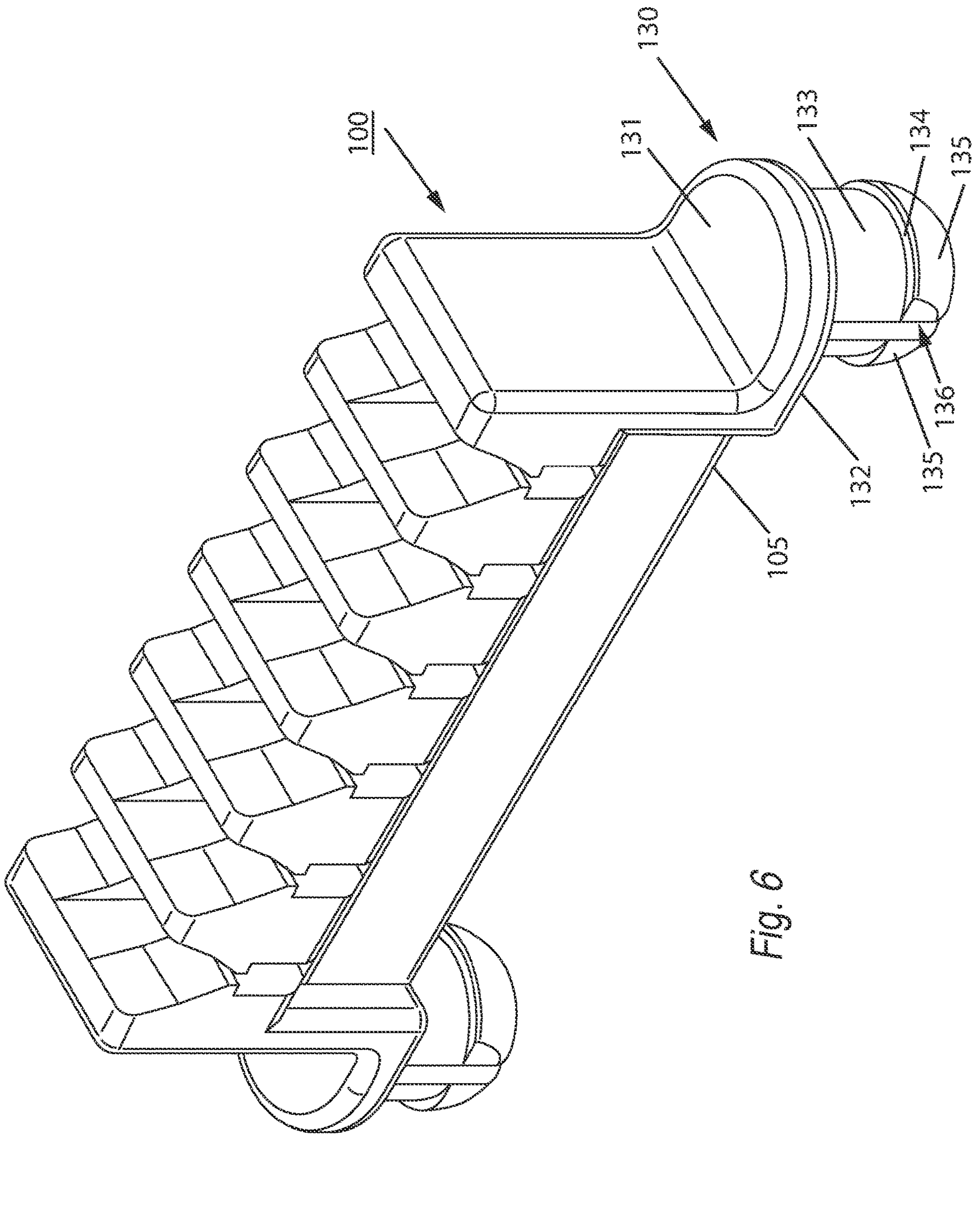
FIG. 6 is a perspective view of another embodiment of the housing of the invention.

In the embodiment shown in FIG. 6, a pair of optional retention posts 130 are present. The retention post 130 extends from an underside 132 of a pedestal 131 attached to the side of the housing 100, and below the bottom surface 105 of the housing 100. The underside 132 of the pedestal 131 being parallel to the top of a PCB, and the bottom surface 105 of the housing to properly level the connector 100. The retention post 130 includes a first protrusion section 133 formed by two halves extending from an underside 132 of a pedestal 131, and a second protrusion section 135 formed by two halves at the end of the first protrusion section, with a gap 136 between both sections 133, 135. The retention post 130 is designed to fit in a hole in a printed circuit board. Typically, a respective hole will be in a PCB, so as to allow the protrusion sections 133 and 135, which are cylindrical, and the second protrusion section 135 wider than the first protrusion section 133, to pass through. The second protrusion section 135 is wider than the PCB hole so as to lock the retention post 130 into a respective PCB hole after insertion. On the upper end of the second protrusion section 135 is a flat sided edge 134 that is parallel to the bottom of a PCB, such that the flat sided edge 134 abuts the underside of the PCB after insertion through the PCB hole. The second protrusion section 135 is also of a domed shape which aids in insertion, wherein the two halves of the second protrusion section 135 flex toward one another during insertion, such that the second protrusion section 135 fits through the hole in the PCB. In order to lock the retention post 130 into the PCB, the two halves of the second protrusion section 135 unflex after insertion through the hole to allow the rearward facing flat sided edge 134 to abut the underside of the PCB 200 and the side walls of the first protrusion section 133 to abut the inner edge of the hole.

The housing 100 is designed to accept a plurality of IDCC header pins and has a plurality of rectangular negative spaces 102 into which the IDCC header pins 300 can reside. As can be seen in FIGS. 5A and B the rectangular negative space 102 provides an opening in the crosswise direction and includes a hole 123 penetrating the bottom surface 105 of the housing, such that there is an opening in the vertical direction. Each negative space 102 is defined by side walls that are complementary to side walls of the upper section 301 and pin barb section 302 of the IDCC header pin 300. These side walls include upper side walls 117 for engaging the side walls 316 of upper section 301 of the IDCC header pin and lower side walls 122 for engaging sides 328 and pin barbs 319, 323 of pin barb section 302. At the boundary between the upper side walls 117 and the lower side walls 122 is stop portion 120, which can engage the forward stop 318 of the upper section 301 of IDCC header pin 300.

Figure 5B:
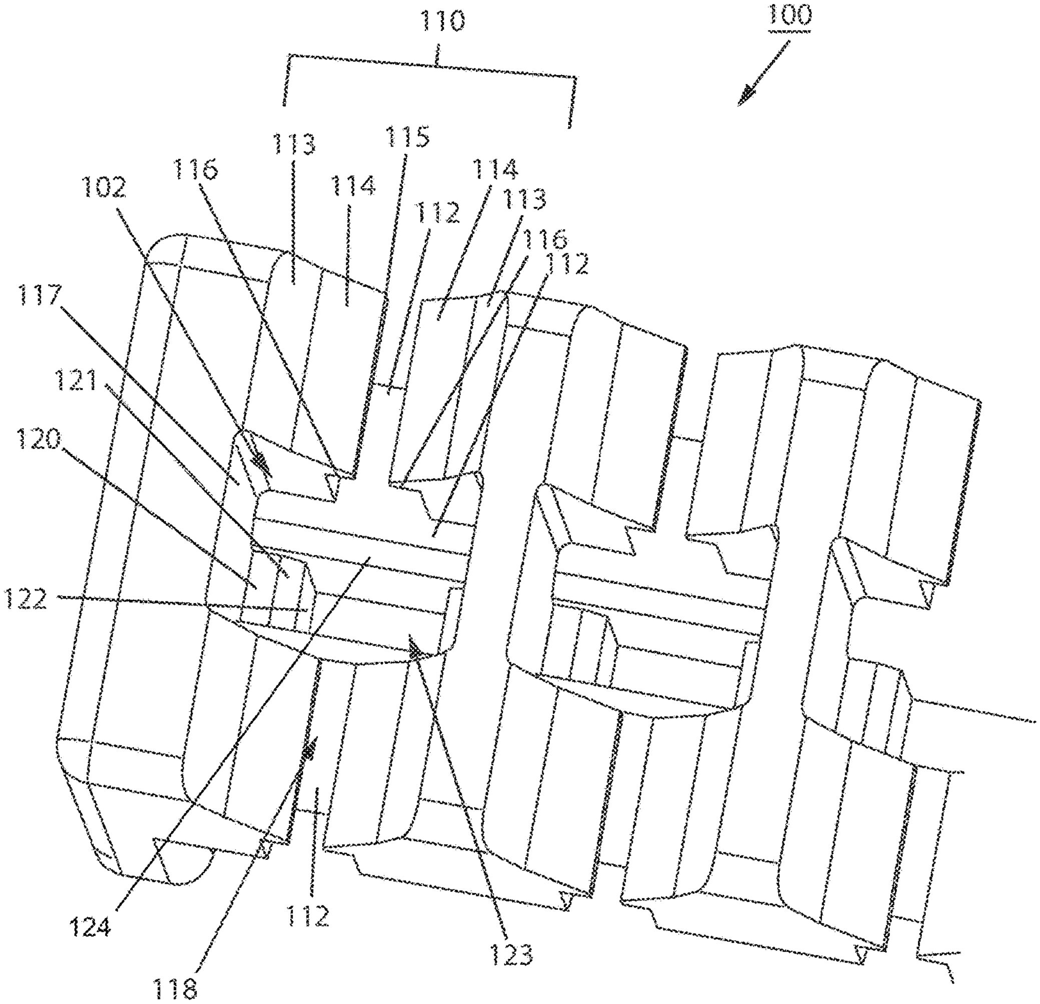
FIG. 5B is a perspective view of a portion of one embodiment of the housing of the invention.
Figure 5C:
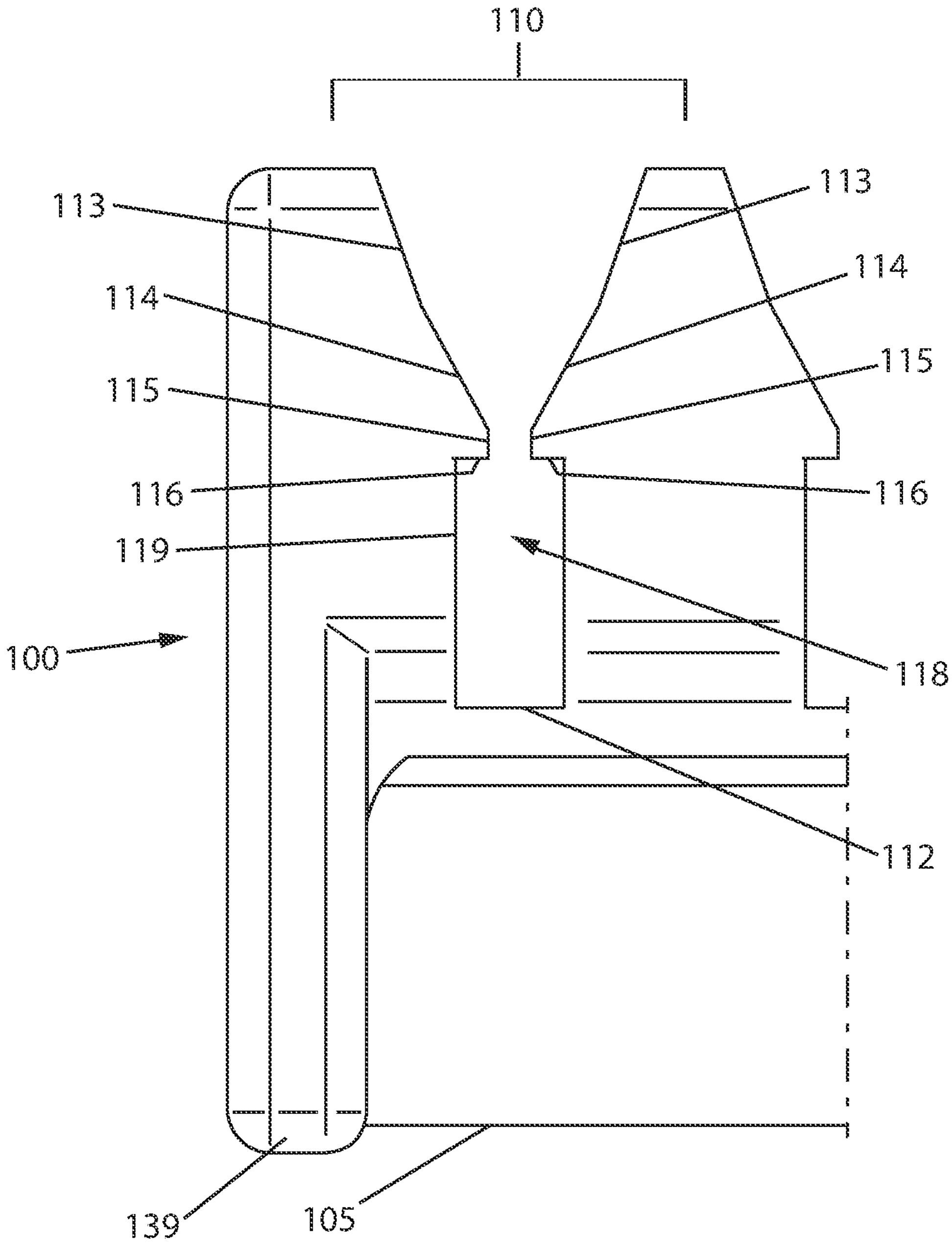
FIG. 5C is a front elevation view of a portion of one embodiment of the housing of the invention.

The lower portion of the negative space 102 includes a hole 123 penetrating the bottom surface 105 of the housing. Around the middle portion of negative space 102, the housing is shaped to have angled edges forming a housing lead-in chamfer 121. The housing lead-in chamfer 121 is designed to engage IDCC header pin barb lead-in chamfer 326, to guide the tip 340 of the IDCC header pin 300 through the hole 123 in the bottom 105 of the housing 100, so that the tip 340 is positioned to penetrate a respective hole 201 in the printed circuit board 200. In addition, housing lead-in chamfer 121 engages barb lead-in chamfer 326 of the IDCC header pin, to seat the pin barb section 302 into the housing 100 and prevent stubbing of the pin 300 (see FIG. 4). FIG. 5B also shows a second housing lead-in chamfer 124.

The housing 100 also has features surrounding the negative spaces 102 which assist in the insertion of a wire into the IDCC header pin 300. As illustrated in FIGS. 5A, B, and C the housing has strain reliefs 110. The strain reliefs 110 are an inverted triangular lead-in, having a first surface 113, and a second surface 114. A channel 118 is formed down the center of the strain relief 110 leading to and across the rectangular negative space 102 from the sides of the housing 100. The function of strain relief 110 is to provide a lead-in for a wire 400 prior (see FIG. 9A. B) to the wire 400 being applied to the blade of the IDCC header pin. Part of the lower end of the second surface 114 is an overhang 115 extending out from the channel walls 119, which has a lower surface 116 parallel to a channel lower surface 112 of the housing 100. Below the overhang 115 and surrounding the channel 118 are channel walls 119 perpendicular to the channel lower surface 112. In use, the width of the channel 118 between the overhangs 115 is smaller than the gap 312 between opposing surfaces of the blade 315 of the inserted IDCC header pin 300 (see FIGS. 4, 10A-D). Below the overhangs 115, the width of the channel 118 between channel side walls 119 is greater than the distance of the gap 312 between opposing surfaces of the blade 315 of the inserted IDCC header pin 300 (see FIG. 4. FIGS. 10A-D).

Figure 7A:
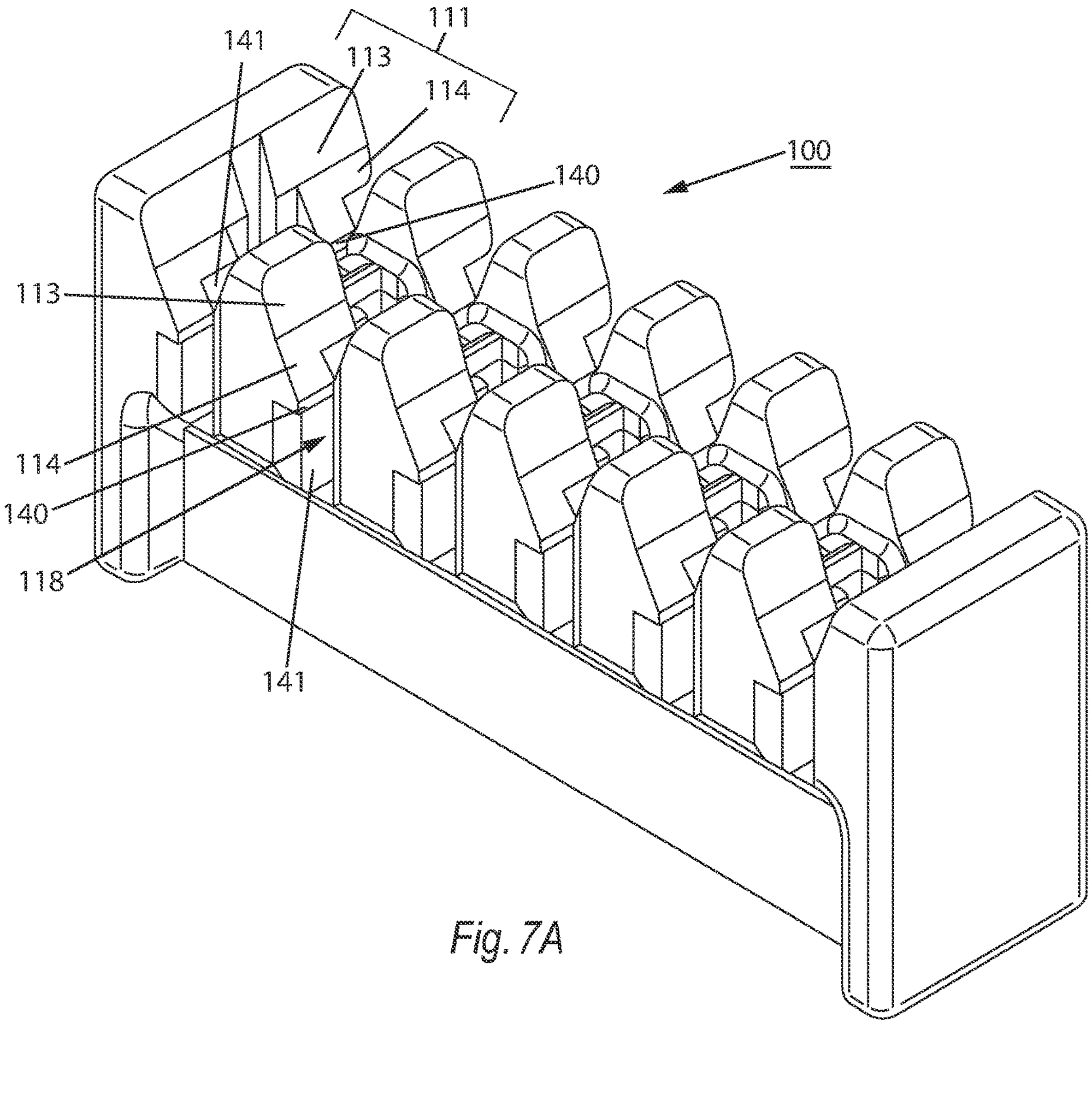
FIG. 7A is a perspective view of another embodiment of the housing of the invention.
Figure 7B:
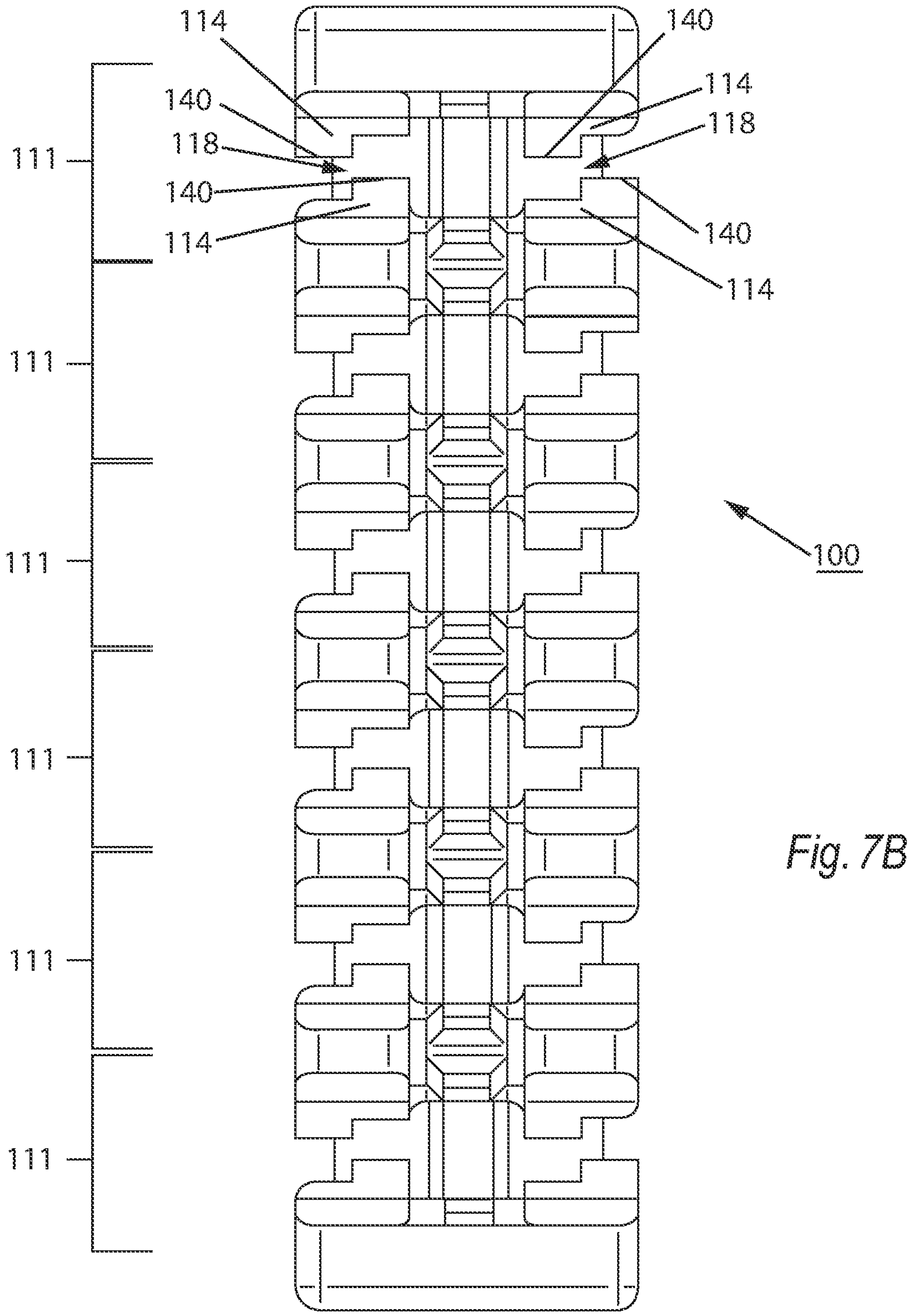
FIG. 7B is a top view of an embodiment of FIG. 7A.
Figure 7C:
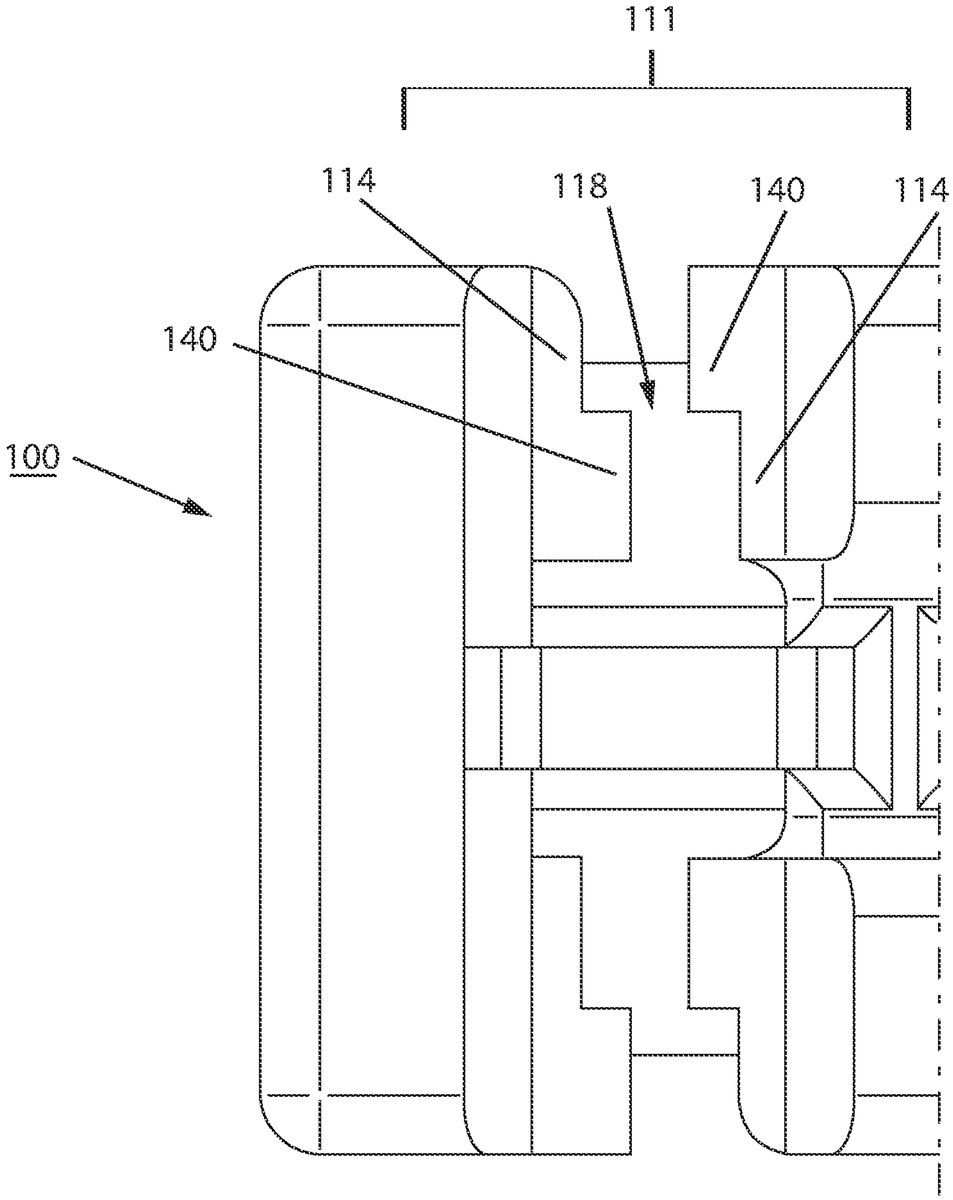
FIG. 7C is a close-up top view of a portion of the embodiment of FIG. 7A.
Figure 7D:
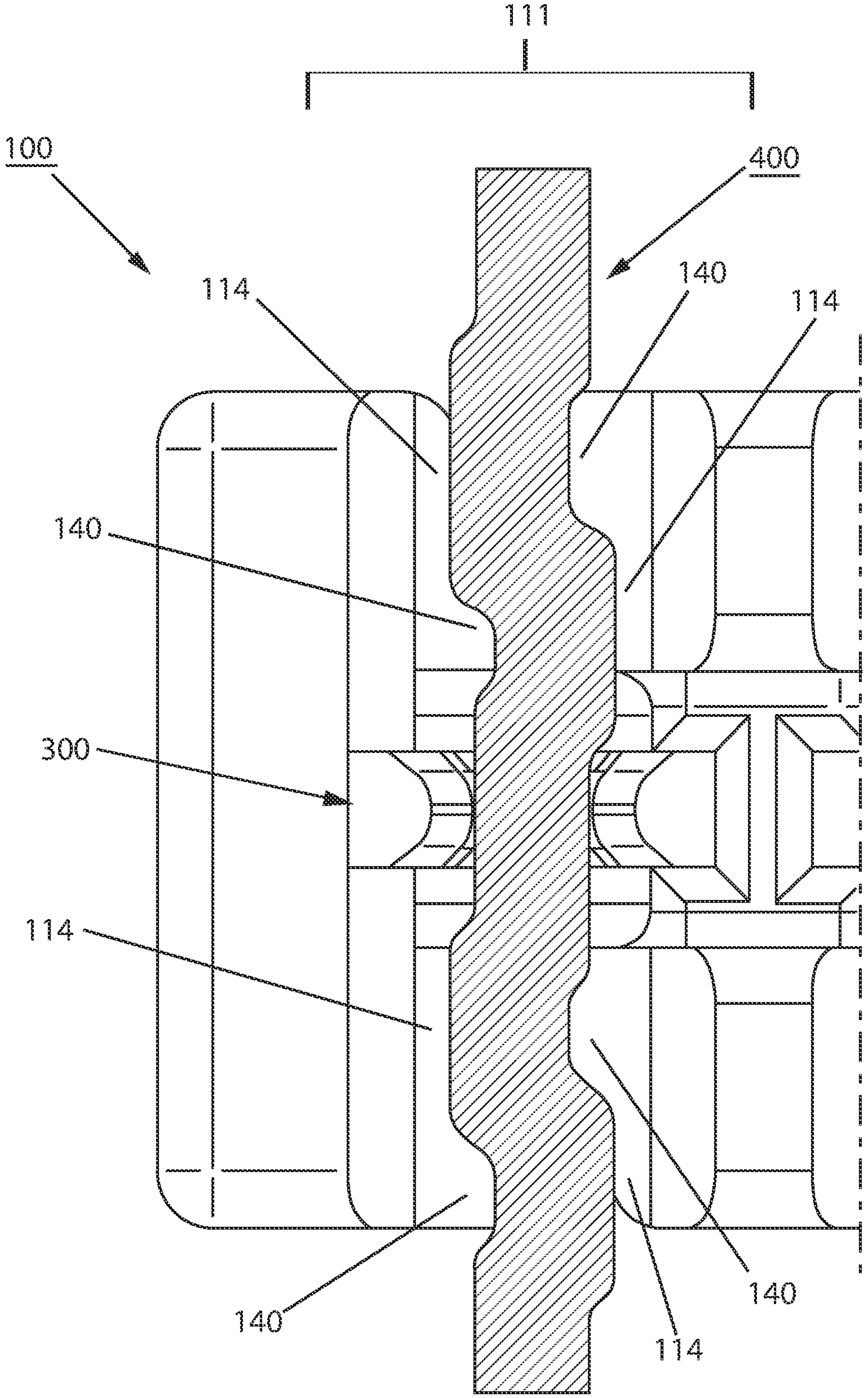
FIG. 7D is a top view of the embodiment of FIG. 7A, illustrating a wire assembled to the system of the invention.

In another embodiment of the housing, as shown in FIGS. 7A. B, C and D a twisting strain relief is provided. The twisting strain relief 111 includes offset overhangs 140 and offset channel wall 141. As seen in FIG. 7D, when a wire 400 is inserted into the housing 100, the wire is deformed and conformed to the structure of the offset overhangs 140 of the lower surface 114 of the strain relief.

Typically, in use, IDCC header pins 300, a housing 100 and a PCB 200 will be assembled and then wires 400 will be inserted into the blade 315 of the IDCC header pins 300. There are several options for this assembly process. A first embodiment of the assembly process includes: a) a pin-to-housing insertion process; b) a housing assembly-to-PCB assembly process; and c) a wire-to-housing assembly assembly process. This assembly is explained below with regard to the steps of the first embodiment:

a) Pin-to-Housing Assembly

A typical pin-to-housing assembly process is shown in FIGS. 8A-E. FIGS. 8A-E illustrate the process for one IDCC header pin and one negative space 102 in a housing. It will be understood that a typical housing will hold a plurality of DCC header pins (see FIG. 4) and that these pins may be inserted simultaneously or sequentially into the negative spaces 102 in the housing.

Figure 8A:
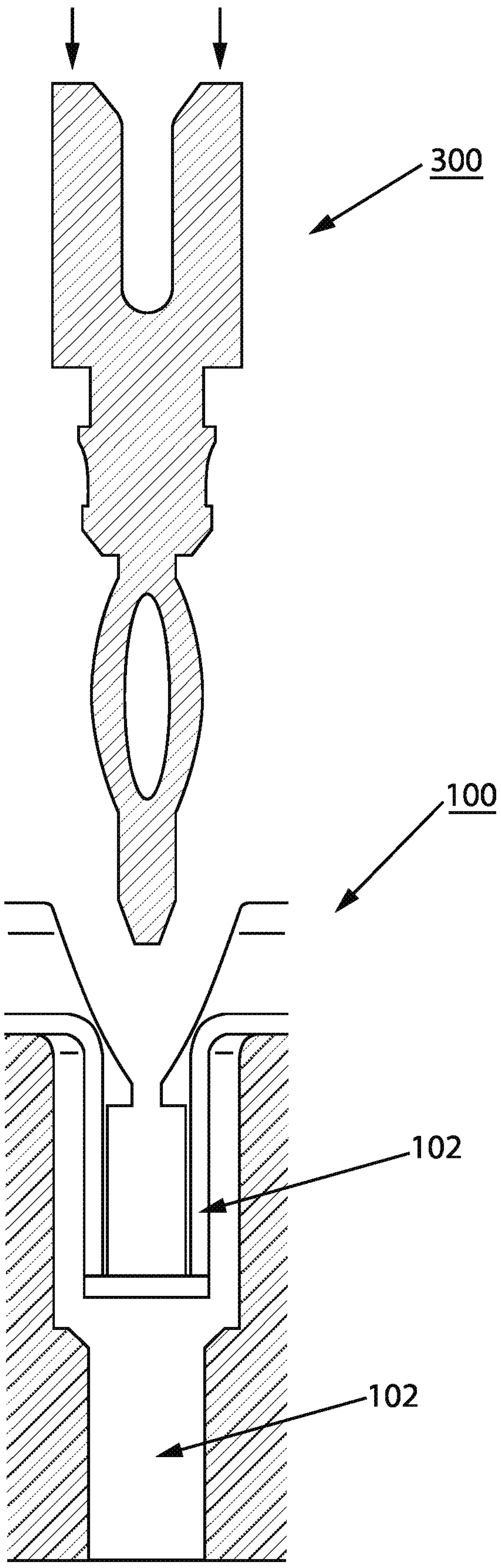

As shown in FIG. 8A, an IDCC header pin is aligned with one negative space 102 on the housing 100, and an insertion force is applied to the IDC flat 310. This force may be applied by a machine/jig (not shown).

Figure 8B:
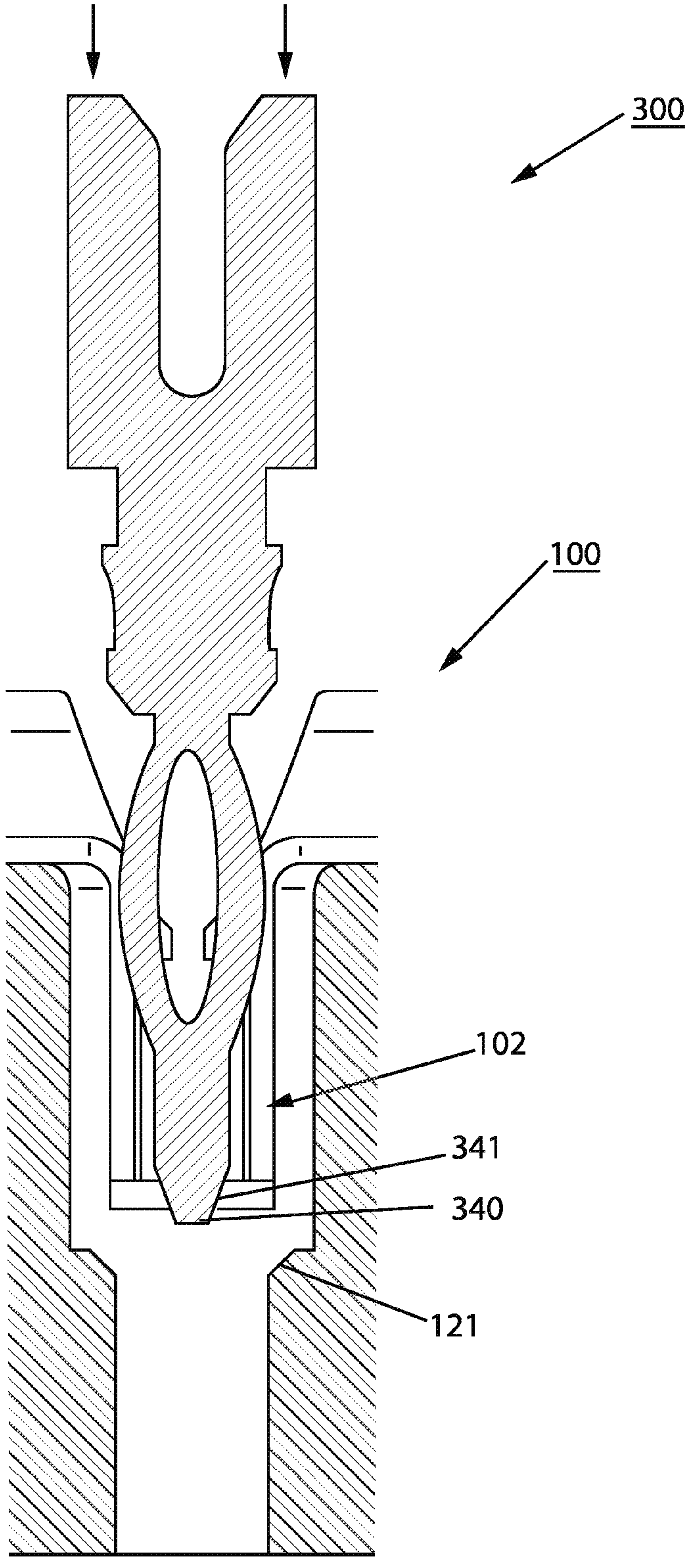

In FIG. 8B, force continues to be applied and the IDCC header pin 300 is inserted partway into the housing 100, where contact might be made between housing lead-in chamfer 121 and pin lead-in chamfer 341. If such contact occurs, housing lead-in chamfer 121 guides the IDCC header pin tip 340 into the lower portion of the rectangular negative space 102.

Figure 8C:
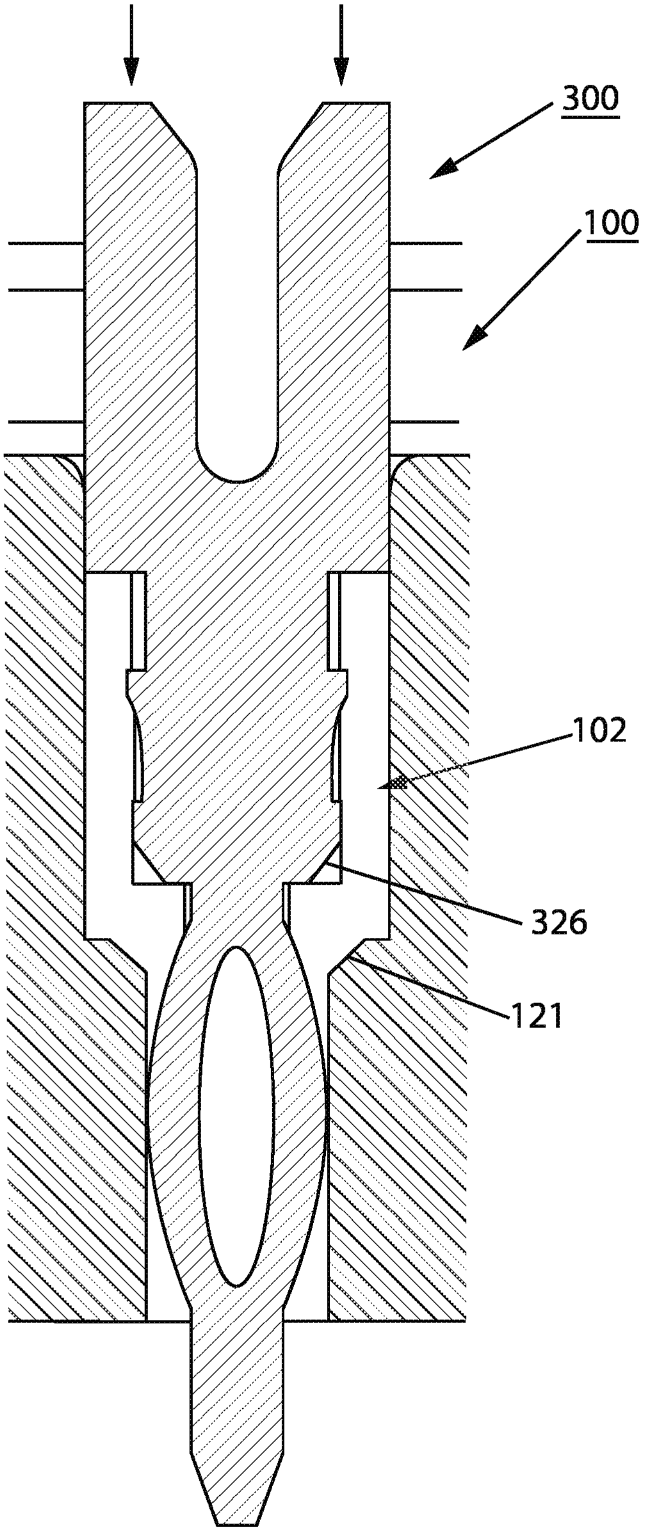

In FIG. 8C, force continues to be applied and the IDCC header pin 30 is inserted further into the housing 100, where IDCC header pin barb lead-in chamfer 326 might engage housing lead-in chamfer 121. The chamfers serve to guide the barb section 302 of the pin into the lower portion of the rectangular negative space 102 without stubbing of the pin 300.

Figure 8D:
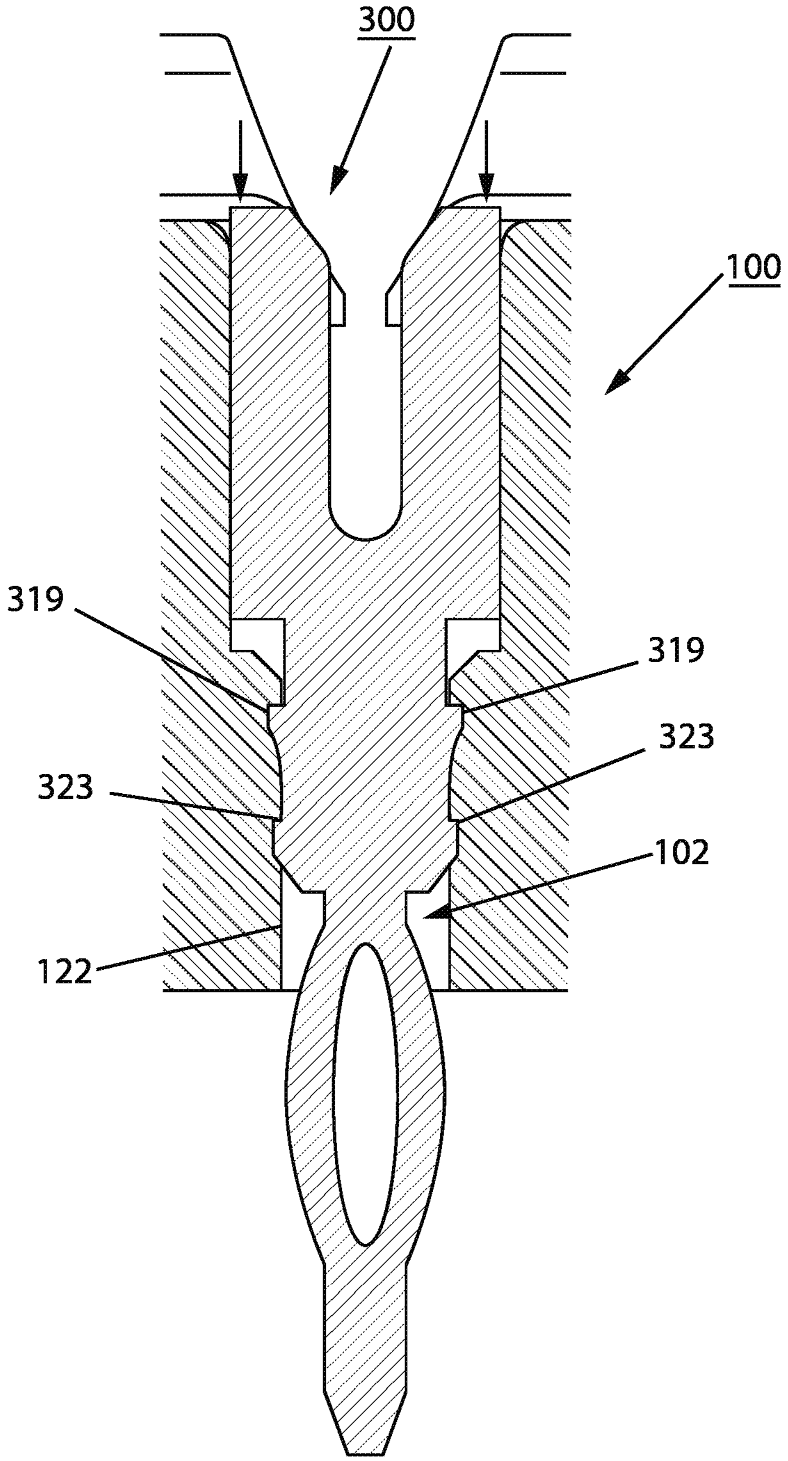

In FIG. 8D, force continues to be applied and the IDCC header pin is inserted further into the housing 100, where first pin barb 319 and second pin barb 323 contact the side walls 122 of the lower portion of the rectangular negative space 102. This contact results in a retention force holding the pin in place.

Figure 8E:
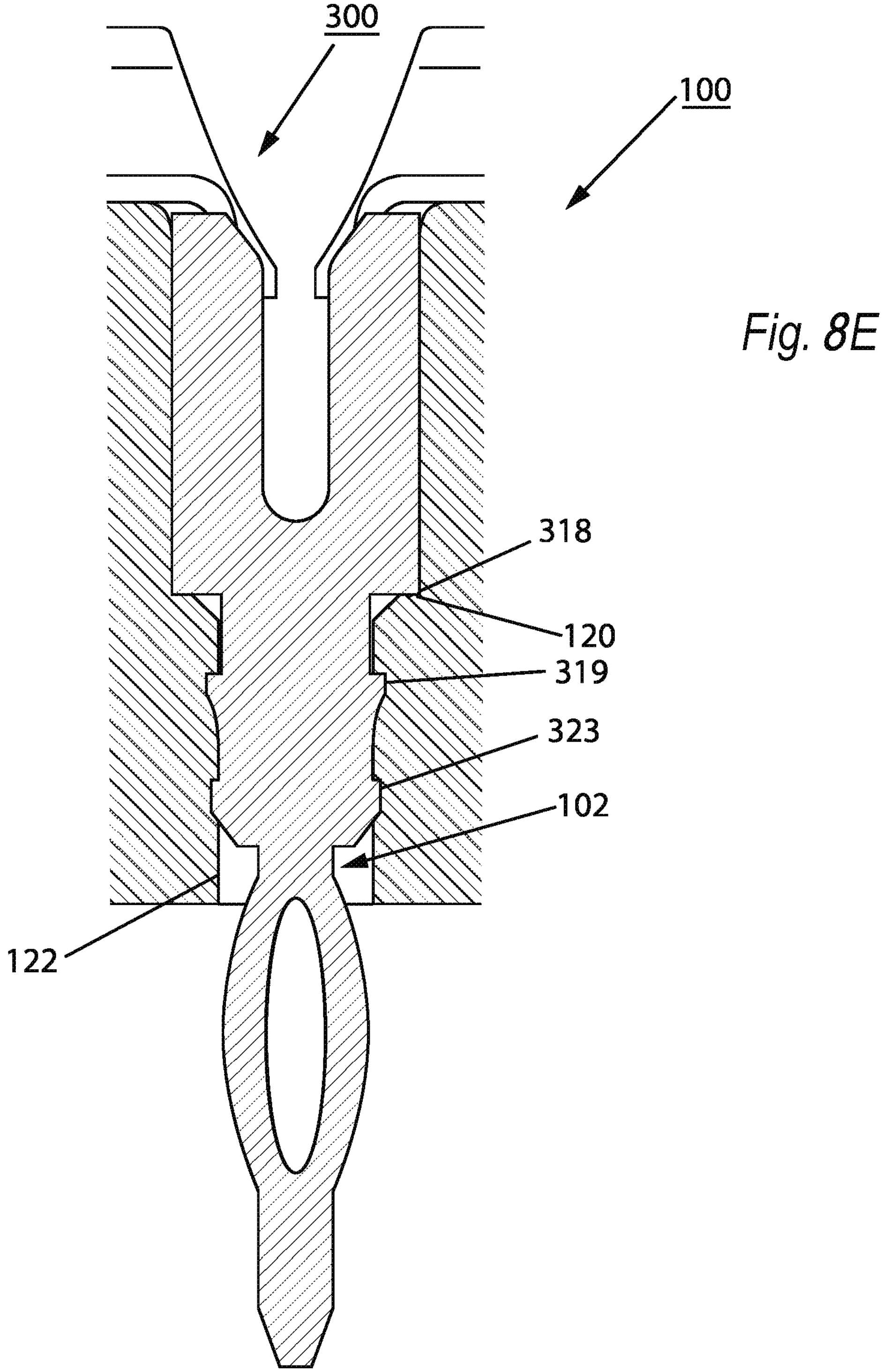

In FIG. 8E, force is applied until the IDCC header pin forward stop 318 comes into contact with housing stop portion 120, at which point movement of the IDCC header pin 300 into the housing 100 stops and the IDCC header pin is seated and retained in the housing 100.

b) Housing Assembly-to-PCB Assembly Process

An exemplary housing assembly-to-PCB assembly process is shown in FIGS. 9A-D.

Figure 9A:
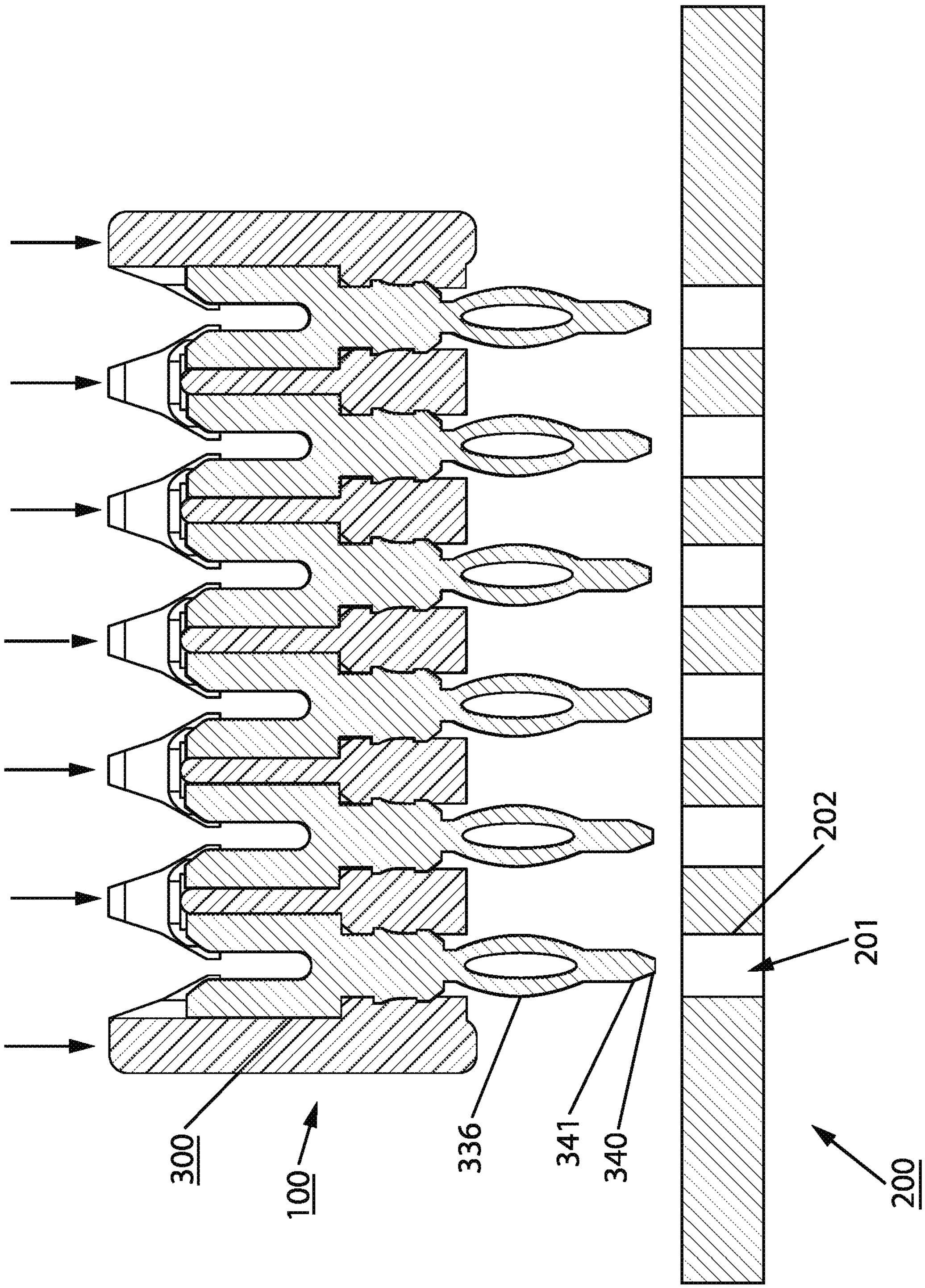

In FIG. 9A, housing 100 has been assembled with seven IDCC header pins 300 using the general pin-to-housing process described above, as a housing assembly. The housing assembly is then aligned with holes of a PCB 200 and pressure is applied as shown by arrows.

Figure 9B:
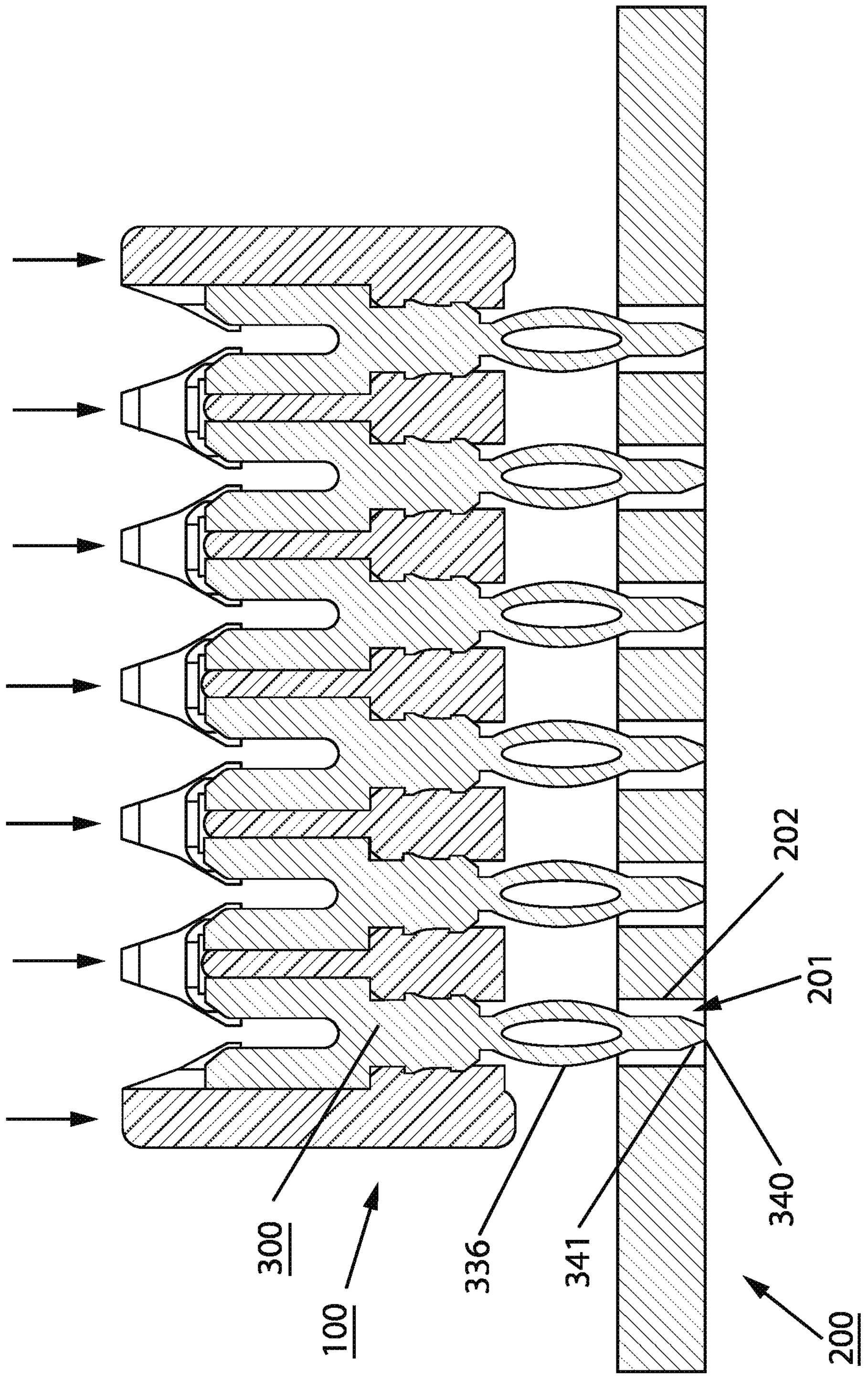

In FIG. 9B, the IDCC tip 340 and pin lead-in chamfers 341 penetrate holes 201 of PCB 200, the lower portion of the IDCC header pin 300 enters the hole 201.

Figure 9C:
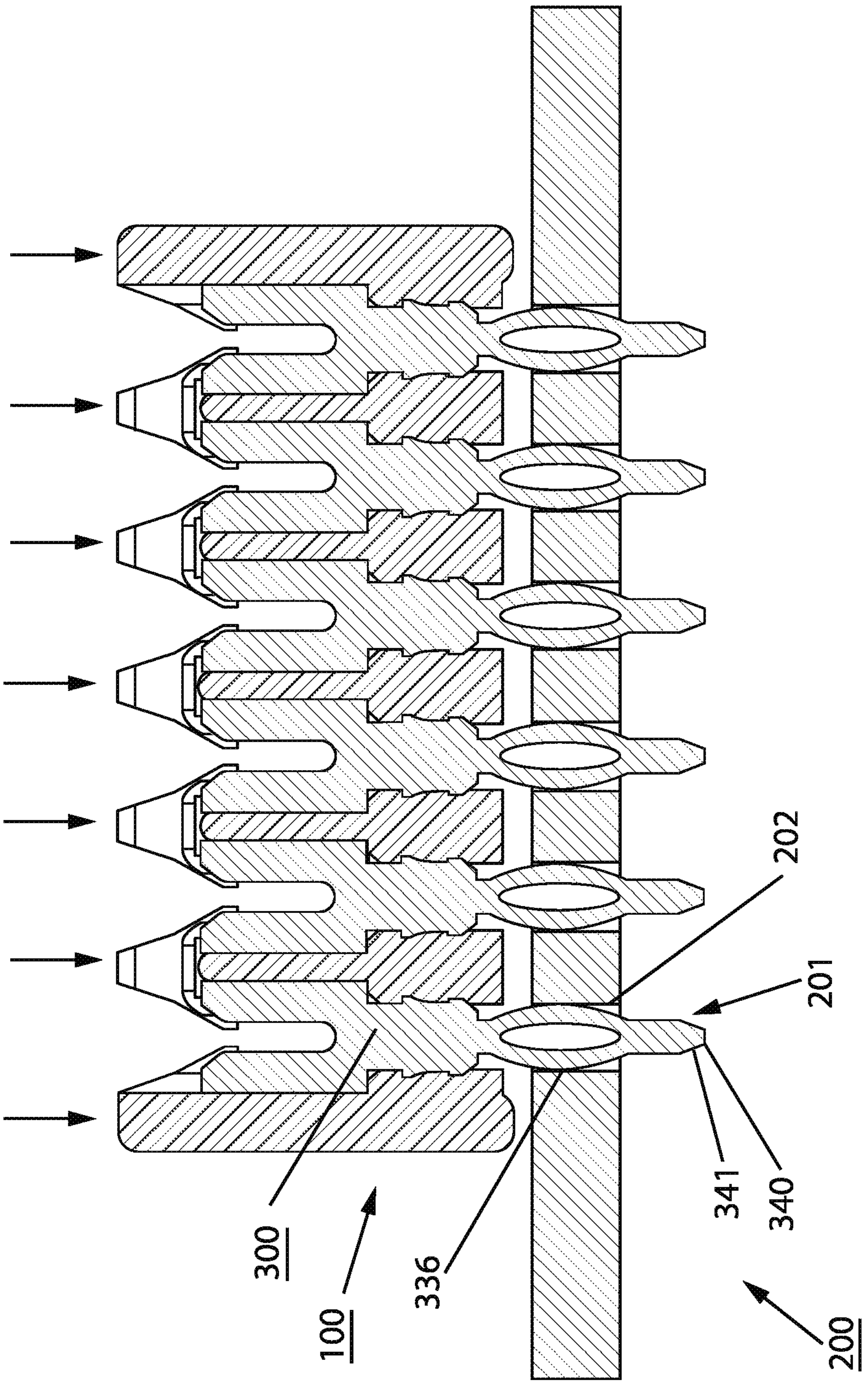

In FIG. 9C, the lower portion of the IDCC header pin enter holes 201 of PCB 200 further. The compliant features 330 are of an eye-of-the-needle shape and the side walls 336 provide elastic force outward as they are compressed by the holes.

Figure 9D:
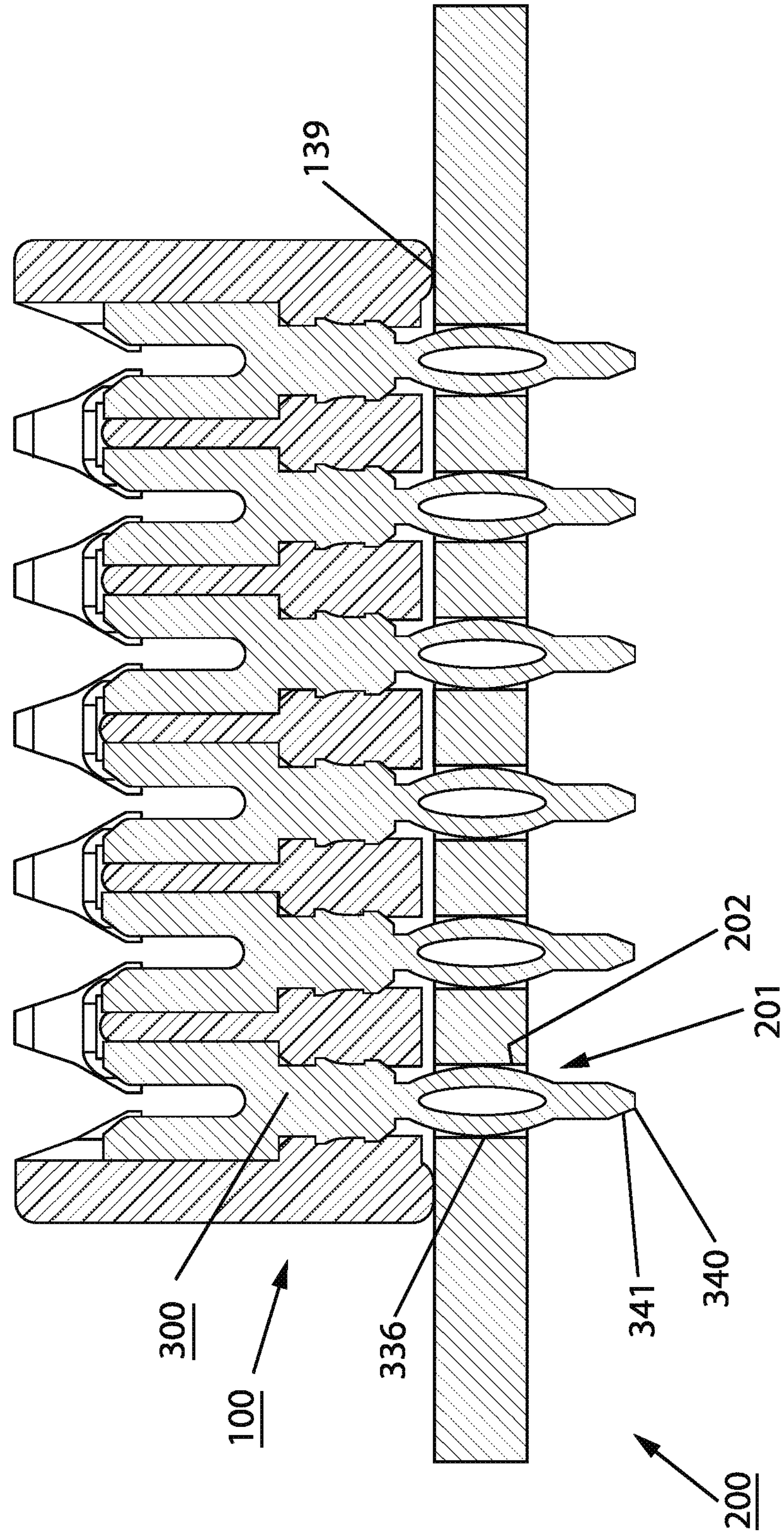

In FIG. 9D, pressure is applied until offsets 139 contact the surface of the PCB 200, whereupon downward motion ceases and the housing 100 is seated on the surface of the PCB 200.

c) Wire-to-Housing Assembly Process

A typical wire-to-housing assembly process is shown in FIGS. 9A-E.

Figure 10A:
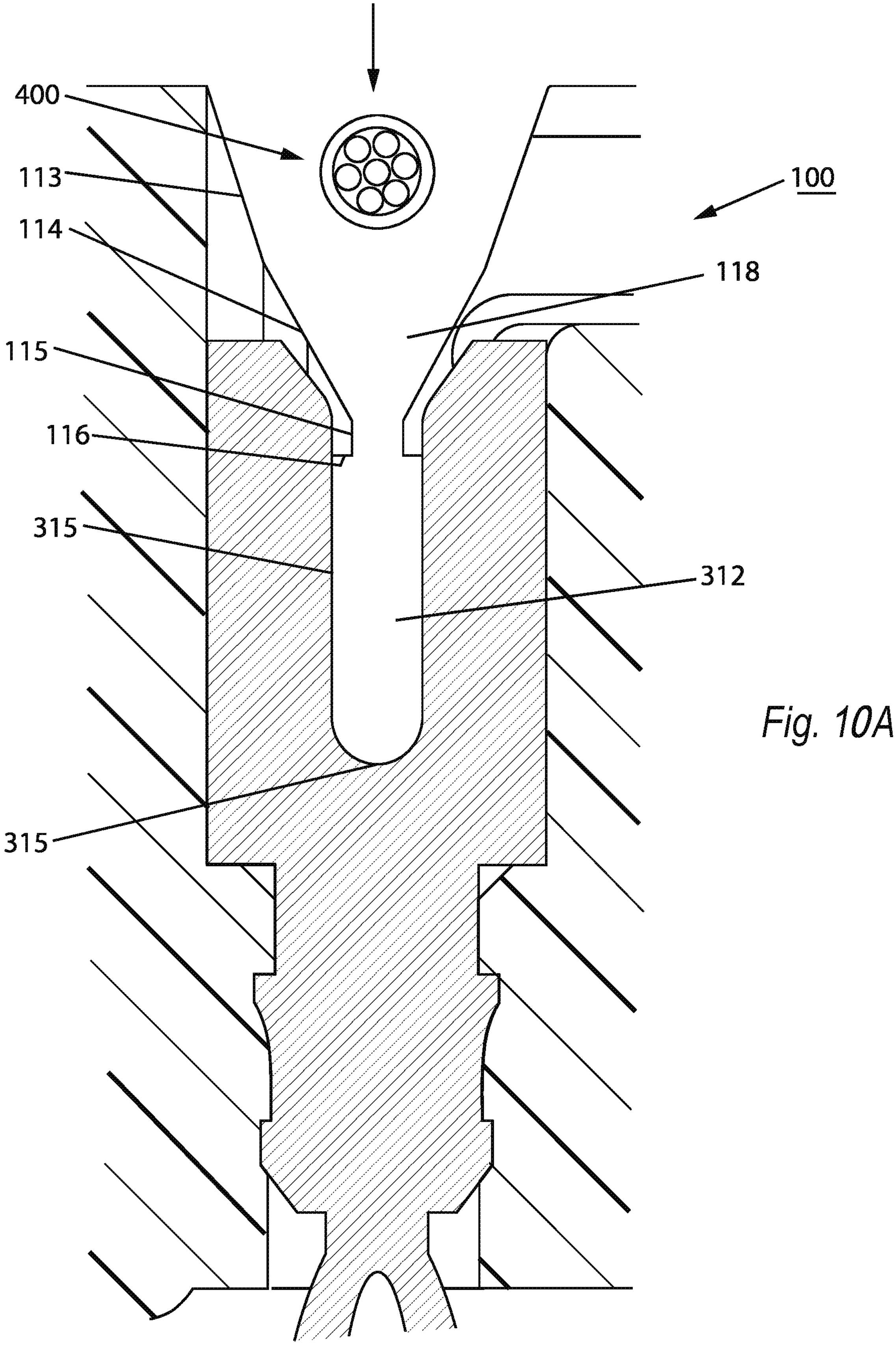

In FIG. 10A, wire 400 is positioned above the housing assembly, an IDCC header pin assembled therein. Downward force is applied to the wire 400.

Figure 10B:
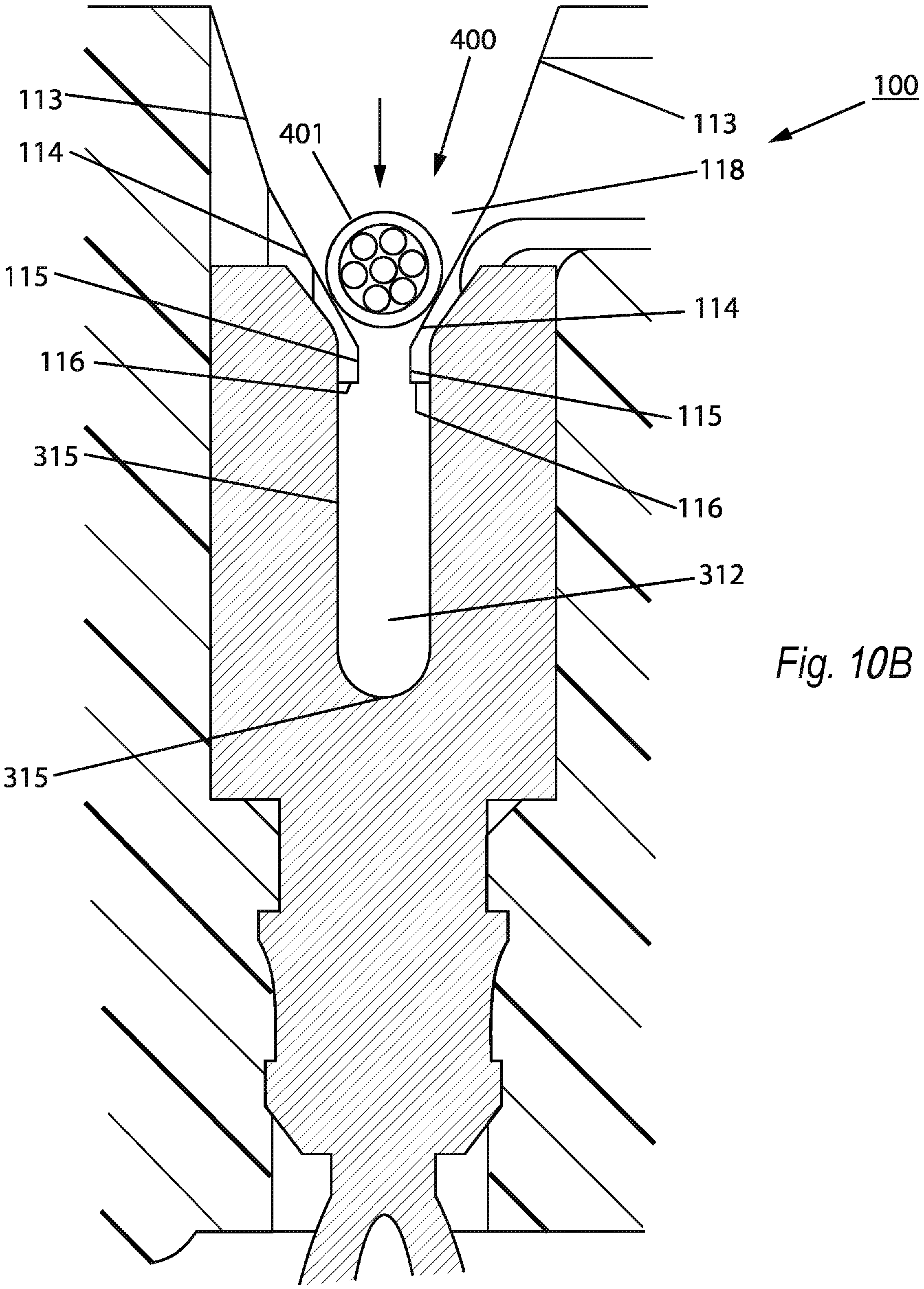

In FIG. 10B, the wire 400 contacts the lower portion 114 of the strain relief, which guides the wire 400 to be centered relative to opposite facing sides of the IDCC blade 315.

Figure 10C:
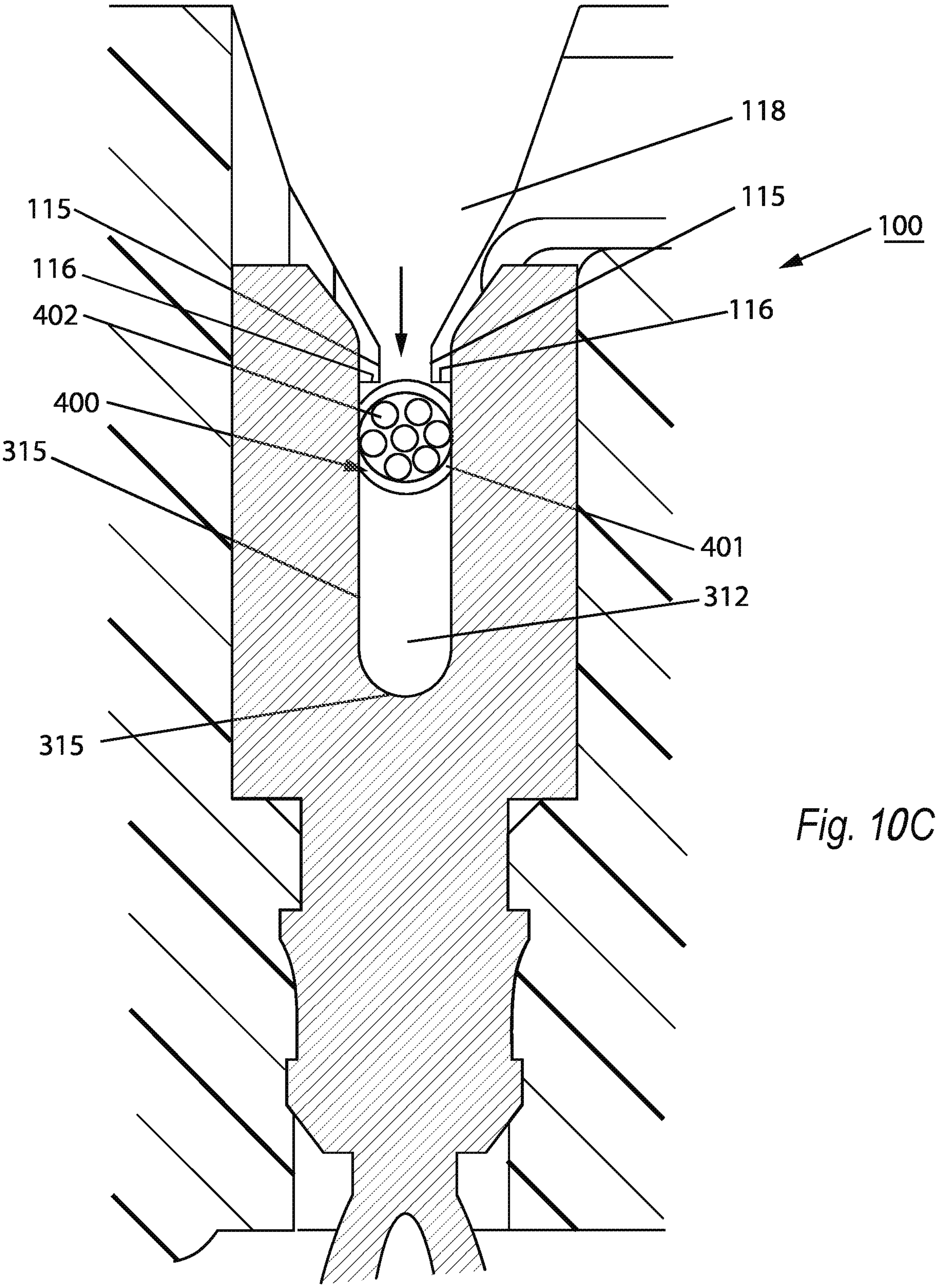

As shown in FIG. 10C, the strain relief causes the wire 400 to deform in order to pass the overhang 115.

Figure 10D:
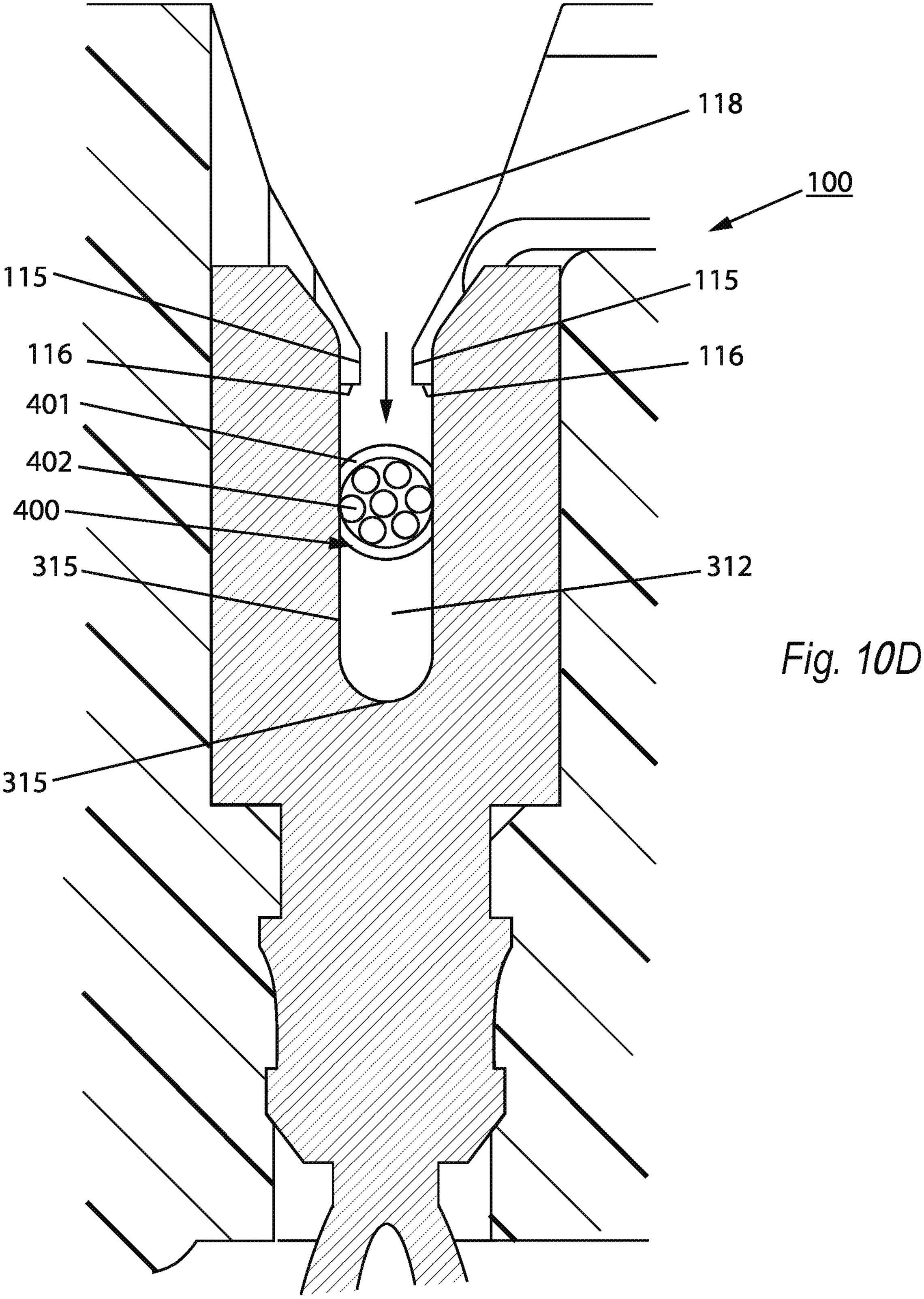

In FIG. 10D, the overhang 115 on the lead-in 114 secures the wire insulation 401 in place to maintain contact between the wire 400 and the IDCC blade 315.

In FIG. 10E, as the wire is forced downward, the IDCC blade 315 cuts into the insulation 401 on the wire 400 to make electrical contact with the conductor portion 402 of the wire 400, without damaging the conductor 402.

There are other options for the assembly process. For example, a second embodiment of the assembly process includes a) a pin-to-housing insertion process; b) a housing assembly-to-PCB assembly process; and c) a wire-to-system assembly process. This second embodiment of the assembly process differ from the first embodiment in the order of the last two steps, that is, whether the wire is assembled before or after the housing assembly is assembled to the PCB. It will be understood that step (b) of the second embodiment is essentially the same as step (c) of the first embodiment, except that the assembled housing is not yet inserted into the PCB, and that step (c) of the second embodiment is essentially the same as step (b) of the first embodiment.

As will be appreciated by those of skill in the art, the IDCC connection system, including the IDCC header pin, housing and assemblies of the present invention, may be used in a wide variety of applications, including applications in which IDC connectors are conventionally used. For example, these connectors may be used in automotive applications.

Although the invention has been described with respect to specific embodiments, it will be appreciated that the invention is intended to cover all modifications and equivalents within the scope of the following claims.

LIST OF REFERENCE NUMERALS

100 Housing
200 Printed Circuit Board (PCB)
300 IDCC header pin
102 Housing Negative Space
105 Bottom Surface of Housing
110 Strain Relief of Housing
111 Twisting Strain Relief of Housing
112 Strain Relief Channel Lower Surface
113 First surface of Strain Relief
114 Second surface of Strain Relief
115 Strain Relief Overhang
116 Strain Relief Overhang Lower Surface
117 Housing upper side walls of Negative Space
118 Strain Relief Channel
119 Side Walls of Strain Relief Channel
120 Housing Stop Portion
121 Housing Lead-in Chamfer
122 Lower Side Walls of Negative Space
123 Housing Hole
124 Second Housing Lead-in Chamfer
130 Housing Retention Posts
131 Housing Retention Post Pedestal

We claim:

1. A housing for accommodating an insulation displacement contact compliant (IDCC) pin, the housing comprising:

a rectangular negative space configured to receive the IDCC pin, the negative space having:

a first negative space, having a first left side, a first right side, a first front side, a first back side, and a strain relief channel lower surface, and forming upper side walls spaced apart from the first left side to the first right side by a first distance, and a second negative space, having a second left side, a second right side, a second front side, a second back side, and forming lower side walls spaced apart from the second left side to the second right side by a second distance less than the first distance, wherein the first and second negative spaces are both configured to receive the lower section, wherein the first negative space is configured to receive a lower section of the IDCC pin before the second negative space receives the lower section of the IDCC pin, wherein the rectangular negative space, the first negative space, and the second negative space are disposed at a center between a front of the housing and a back of the housing;

a strain relief with an overhang, disposed above the upper side walls, wherein the strain relief includes a first strain relief at the left side of the first negative space, a second strain relief at the left side of the first negative space, a third strain relief at the right side of the first negative space, and a fourth strain relief at the right side of the first negative space, wherein the first negative space is disposed at a central location between the first and second strain relief, wherein the first negative space is disposed at a central location between the third and fourth strain relief;

angled edges forming a first housing lead-in chamfer extending from the second front side to the second back side of the second negative space, disposed between the upper side walls and the lower side walls, wherein the first housing lead-in chamfer has a left side, a right side in direct contact with the second left side of the second negative space, a front side in direct contact with the second front side of the second negative space, and a back side in direct contact with the second back side of the second negative space;

a bottom surface forming a hole; and a stop portion at which point a forward stop of the IDCC pin, upon insertion thereof, stops and becomes seated in the housing, wherein the stop portion has a left side in direct contact with the first left side of the first negative space, a right side in direct contact with the left side of the first housing lead-in chamfer, a front side in direct contact with the second front side of the second negative space, a back side in direct contact with the second back side of the second negative space, wherein the first housing lead-in chamfer extends from the stop portion to the lower side walls, wherein the first housing lead-in chamfer is configured to engage a pin lead-in chamfer and a barb lead-in chamfer of the IDCC pin to guide a tip of the IDCC pin through the hole, wherein the first housing lead-in chamfer is in direct contact with the stop portion, wherein the IDCC pin has a first side and a second side, wherein the IDCC pin has at least a first barb on the first side and at least a second barb on the second side, and wherein each of the barbs has a lower angled portion with a barb lead-in chamfer facing down toward a header pin tip, a middle flat portion parallel to a lengthwise direction of the IDCC pin, and an upper flat portion perpendicular to the lengthwise direction of the IDCC pin, wherein the first housing lead-in chamfer is configured to engage the barb lead-in chamfer to guide the header pin tip through the hole, angled edges forming a second housing lead-in chamfer extending from the first left side to the first right side of the first negative space, disposed between the upper side walls and the lower side walls, wherein the second housing lead-in chamfer has a left side in direct contact with the first left side of the first negative space, a right side in direct contact with the first right side of the first negative space, a front side in direct contact with the second back side of the second negative space, and a back side in direct contact with the strain relief channel lower surface;

wherein the strain relief, the first negative space forming the upper side walls, the second negative space forming the lower side walls, and the hole have a common center, wherein each one of the first strain relief, the second strain relief, the third strain relief, and the fourth strain relief includes a respective first surface, a respective overhang, and a respective second surface disposed between the first surface and the overhang, wherein each of the second surfaces is a lead-in, wherein the second surface is configured to be contacted by a wire and to guide the wire, wherein the overhang is configured to secure a wire insulation in place to maintain contact between the wire and a blade of the insulation displacement contact compliant pin, wherein a first channel is formed along a vertical direction between the first and third strain reliefs, wherein a second channel is formed along the vertical direction between the second and fourth strain reliefs, wherein the first and second channels are configured to accommodate the wire placed in a horizontal direction perpendicular to the vertical direction, wherein the first channel is configured to accommodate a front section of the wire, wherein the second channel is configured to accommodate a back section of the wire, wherein the rectangular negative space is surrounded by the first strain relief, the second strain relief, the third strain relief, and the fourth strain relief, wherein the first strain relief and third strain relief are disposed directly in front of the rectangular negative space and form a front surface of the rectangular negative space, wherein the second strain relief and fourth strain relief are disposed directly behind the rectangular negative space and form a back surface of the rectangular negative space, wherein the first strain relief and the third strain relief are configured to receive the wire with the insulation displacement contact compliant pin, the first strain relief and the third strain relief being configured to contact the wire and center the wire relative to opposing facing sides of the blade of the insulation displacement contact compliant pin, and wherein the overhang of the first strain relief and the overhang of the third strain relief are configured to be passed by the wire while the wire maintains contact with the opposing facing sides of the blade of the insulation displacement contact compliant pin.

2. A housing, comprising:

a bottom surface;

a hole through the bottom surface;

a plurality of rectangular negative spaces including at least a first rectangular negative space into which an insulation displacement contact compliant pin forming a lower section having a tip with a pin lead-in chamfer, forming a pin barb section having a first barb, a second barb, and a barb lead-in chamfer on the second barb, and forming an upper section having a forward stop can be inserted, each of the rectangular negative spaces having a first negative space, having a first left side, a first right side, a first front side, a first back side, and a strain relief channel lower surface, and forming upper side walls spaced apart from the first left side to the first right side by a first distance, and a second negative space, having a second left side, a second right side, a second front side, a second back side, and forming lower side walls spaced apart from the second left side to the second right side by a second distance less than the first distance, wherein the first and second negative spaces are both configured to receive the lower section, wherein the first negative space is configured to receive the lower section before the second negative space receives the lower section, wherein the first rectangular negative space, the first negative space, and the second negative space are disposed at a center between a front of the housing and a back of the housing;

a strain relief with an overhang, disposed above the upper side walls, wherein the strain relief includes a first strain relief at the left side of the first negative space, a second strain relief at the left side of the first negative space, a third strain relief at the right side of the first negative space, and a fourth strain relief at the right side of the first negative space, wherein the first negative space is disposed at a central location between the first and second strain relief, wherein the first negative space is disposed at a central location between the third and fourth strain relief;

angled edges forming a first housing lead-in chamfer extending from the second front side to the second back side of the second negative space, disposed between the upper side walls and the lower side walls, wherein the first housing lead-in chamfer has a left side, a right side in direct contact with the second left side of the second negative space, a front side in direct contact with the second front side of the second negative space, and a back side in direct contact with the second back side of the second negative space; and a stop portion at which point the forward stop of the insulation displacement contact compliant pin, upon insertion thereof, stops and becomes seated in the housing, wherein the stop portion has a left side in direct contact with the first left side of the first negative space, a right side in direct contact with the left side of the first housing lead-in chamfer, a front side in direct contact with the second front side of the second negative space, a back side in direct contact with the second back side of the second negative space, wherein the first housing lead-in chamfer extends from the stop portion to the lower side walls, wherein the first housing lead-in chamfer is configured to engage the pin lead-in chamfer and the barb lead-in chamfer to guide the tip through the hole, angled edges forming a second housing lead-in chamfer extending from the first left side to the first right side of the first negative space, disposed between the upper side walls and the lower side walls, wherein the second housing lead-in chamfer has a left side in direct contact with the first left side of the first negative space, a right side in direct contact with the first right side of the first negative space, a front side in direct contact with the second back side of the second negative space, and a back side in direct contact with the strain relief channel lower surface;

wherein the strain relief, the first negative space forming the upper side walls, the second negative space forming the lower side walls, and the hole have a common center, wherein each one of the first strain relief, the second strain relief, the third strain relief, and the fourth strain relief includes a respective first surface, a respective overhang, and a respective second surface disposed between the first surface and the overhang, wherein each of the second surfaces is a lead-in, wherein the second surface is configured to be contacted by a wire and to guide the wire, wherein the overhang is configured to secure a wire insulation in place to maintain contact between the wire and a blade of the insulation displacement contact compliant pin, wherein a first channel is formed along a first direction between the first and third strain reliefs, wherein a second channel is formed along the first direction between the second and fourth strain reliefs, wherein the first and second channels are configured to accommodate the wire placed in a second direction perpendicular to the first direction, wherein the first channel is configured to accommodate a front section of the wire, wherein the second channel is configured to accommodate a back section of the wire, wherein the first rectangular negative space is surrounded by the first strain relief, the second strain relief, the third strain relief, and the fourth strain relief, wherein the first strain relief and third strain relief are disposed directly in front of the first rectangular negative space and form a front surface of the first rectangular negative space, wherein the second strain relief and fourth strain relief are disposed directly behind the first rectangular negative space and form a back surface of the first rectangular negative space, wherein the first strain relief and the third strain relief are configured to receive the wire with the insulation displacement contact compliant pin, the first strain relief and the third strain relief being configured to contact the wire and center the wire relative to opposing facing sides of the blade of the insulation displacement contact compliant pin, and wherein the overhang of the first strain relief and the overhang of the third strain relief are configured to be passed by the wire while the wire maintains contact with the opposing facing sides of the blade of the insulation displacement contact compliant pin.

3. The housing according to claim 2, further comprising a pedestal with a retention post extending from the pedestal.

4. The housing according to claim 2, further comprising offsets on the bottom surface.

5. The housing according to claim 2, further comprising retention posts.

6. The housing according to claim 2, wherein the upper section has the blade thereon, and the lower section has a compliant retention feature.

7. The housing according to claim 6, further comprising a printed circuit board attached thereto.

8. The housing according to claim 2, wherein the lower side walls are configured to engage the barbs of the insulation displacement contact compliant pin.

9. The housing according to claim 8, further comprising offsets on the bottom surface.

10. The housing according to claim 8, further comprising retention posts.

* * * * *